US010726594B2

(12) United States Patent
Eppolito et al.

(10) Patent No.: US 10,726,594 B2
(45) Date of Patent: Jul. 28, 2020

(54) GROUPING MEDIA CONTENT FOR AUTOMATICALLY GENERATING A MEDIA PRESENTATION

(71) Applicant: Apple Inc., Cupertino, CA (US)

(72) Inventors: Aaron M. Eppolito, Los Gatos, CA (US); Anne E. Fink, San Jose, CA (US); Giovanni Agnoli, Cupertino, CA (US); Wendy L. DeVore, Truckee, CA (US); Gregory Dudey, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 75 days.

(21) Appl. No.: 15/283,098

(22) Filed: Sep. 30, 2016

(65) Prior Publication Data

US 2017/0091154 A1 Mar. 30, 2017

Related U.S. Application Data

(60) Provisional application No. 62/235,550, filed on Sep. 30, 2015, provisional application No. 62/235,548, filed on Sep. 30, 2015.

(51) Int. Cl.
*G06T 11/60* (2006.01)
*G06K 9/00* (2006.01)
(Continued)

(52) U.S. Cl.
CPC .......... *G06T 11/60* (2013.01); *G06K 9/00677* (2013.01); *G06F 3/0481* (2013.01);
(Continued)

(58) Field of Classification Search
None
See application file for complete search history.

(56) References Cited

U.S. PATENT DOCUMENTS 6,757,027 B1 6/2004 Edwards et al.
6,807,361 B1 10/2004 Girgensohn et al.
(Continued)

FOREIGN PATENT DOCUMENTS

CN 100525459 C 8/2009
CN 103077734 A 5/2013
(Continued)

*Primary Examiner* — Cesar B Paula
*Assistant Examiner* — John M Heffington
(74) *Attorney, Agent, or Firm* — Invoke

(57) ABSTRACT

Some embodiments provide a media compositing method that performs automated processes (1) to analyze the media content pieces (MCPs) to define one or more MCP groups, and (2) produces a user interface (UI) layout that identifies the defined MCP groups as groups for which the method can display composite presentations (e.g., video presentations). To define the MCP groups, the method of some embodiments uses one or more media grouping templates (MGTs). In some embodiments, the method can define multiple MGT instances for an MGT. For instance, in some embodiments, the MGTs include (1) location-bounded MGTs (e.g., videos and/or photos captured within a region with a particular radius), (2) time-bounded MGTs (e.g., videos and/or photos captured within a particular time range and/or date range), (3) time-bounded and location-bounded MGTs (e.g., mornings at a beach), (4) content-defined MGTs (e.g., videos and/or photos containing smiles), and (5) user-metadata based MGTs (e.g., MCPs from albums created by the user, MCPs shared by a user with others, MCPs having particular user-defined metadata tags, etc.).

20 Claims, 15 Drawing Sheets

(51) Int. Cl.
    *G06F 3/0481* (2013.01)
    *G06F 3/0484* (2013.01)
(52) U.S. Cl.
    CPC ...... *G06F 3/04845* (2013.01); *G06F 3/04847* (2013.01); *G06K 2209/27* (2013.01); *G06T 2200/24* (2013.01)

(56) References Cited

U.S. PATENT DOCUMENTS

| | | |
|---|---|---|
| 7,301,092 B1 | 11/2007 | McNally et al. |
| 7,424,204 B2 | 9/2008 | Nakamura |
| 7,483,618 B1 | 1/2009 | Edwards et al. |
| 8,238,718 B2 | 8/2012 | Toyama et al. |
| 8,606,083 B2 | 12/2013 | Girgensohn et al. |
| 2003/0107592 A1 | 6/2003 | Li et al. |
| 2003/0160944 A1 | 8/2003 | Foote et al. |
| 2004/0054542 A1 | 3/2004 | Foote et al. |
| 2004/0085341 A1 | 5/2004 | Hua et al. |
| 2004/0255150 A1 | 12/2004 | Sezan et al. |
| 2005/0141859 A1 | 6/2005 | Cheatle |
| 2005/0281255 A1 | 12/2005 | Davies et al. |
| 2007/0132874 A1 | 6/2007 | Forman et al. |
| 2009/0070346 A1* | 3/2009 | Savona ............... G06F 16/35 |
| 2011/0007797 A1 | 1/2011 | Palmer et al. |
| 2011/0131496 A1 | 6/2011 | Abram et al. |
| 2011/0283210 A1* | 11/2011 | Berger ................ G06F 3/0481 715/765 |
| 2012/0020648 A1 | 1/2012 | Yamaji |
| 2012/0108293 A1* | 5/2012 | Law ............... G06F 17/30056 455/557 |
| 2012/0189284 A1 | 7/2012 | Bibik |
| 2012/0210200 A1* | 8/2012 | Berger ................ G06F 3/0481 715/202 |
| 2012/0272171 A1 | 10/2012 | Icho et al. |
| 2013/0060641 A1* | 3/2013 | Al Gharably ....... H04H 60/63 705/14.66 |
| 2013/0077805 A1 | 3/2013 | Kirsch |
| 2013/0132844 A1 | 5/2013 | Oakley et al. |
| 2013/0330062 A1 | 12/2013 | Meikle et al. |
| 2013/0336590 A1* | 12/2013 | Sentinelli ............ H04N 5/772 382/218 |
| 2013/0343727 A1 | 12/2013 | Rav-Acha et al. |
| 2013/0343729 A1 | 12/2013 | Rav-Acha et al. |
| 2014/0076124 A1 | 3/2014 | Kellett et al. |
| 2014/0267395 A1 | 9/2014 | Ross et al. |
| 2014/0301653 A1* | 10/2014 | Murphy-Chutorian ............ G06K 9/00221 382/224 |
| 2014/0376887 A1 | 12/2014 | Tijssen et al. |
| 2015/0046842 A1* | 2/2015 | Barr .................. H04L 65/403 715/753 |
| 2015/0078680 A1 | 3/2015 | Shakib et al. |
| 2015/0160916 A1 | 6/2015 | Lothian |
| 2015/0194185 A1 | 7/2015 | Eronen et al. |
| 2015/0234833 A1* | 8/2015 | Cremer .............. G06F 17/3053 707/626 |
| 2015/0243326 A1 | 8/2015 | Pacurariu et al. |
| 2015/0318020 A1 | 11/2015 | Pribula |
| 2016/0286072 A1 | 9/2016 | Hino et al. |

FOREIGN PATENT DOCUMENTS

| | | |
|---|---|---|
| CN | 103842936 A | 6/2014 |
| EP | 1587111 A1 | 10/2005 |
| EP | 2159797 A1 | 3/2010 |

\* cited by examiner

GROUPING MEDIA CONTENT FOR AUTOMATICALLY GENERATING A MEDIA PRESENTATION

BACKGROUND

With the proliferation of digital cameras and mobile devices with digital cameras, people today have more digital content than ever before. As such, the need for tools for presenting and viewing this digital content has never been greater. Unfortunately, many of the tools today require users to manually organize their content. Also, many of these editing tools require users to manually select their content for editing and to manually edit their content. Because of this manual approach, most digital content simply resides in vast digital media libraries waiting for the rare occasion that they can be manually discovered, and in even rarer occasions, painstakingly edited to be part of composite presentations.

SUMMARY

Some embodiments provide a media compositing method with several novel features. In some embodiments, this method is performed by an application that executes on a computing device that stores media content pieces (e.g., videos, still images, etc.), and/or that has access through a network to media content pieces (MCPs) stored on other computing devices. The method of some embodiments performs an automated process that (1) analyzes the MCPs (e.g., analyzes the content and/or metadata of the MCPs) to define one or more MCP groups, and (2) produces a user interface (UI) layout that identifies the defined MCP groups as groups for which the method can display composite presentations (e.g., video presentations).

To define the MCP groups, the method of some embodiments uses one or more media grouping templates (templates). A template in some embodiment is defined by reference to a set of media matching attributes. The method compares a template's attribute set with the content and/or metadata of the MCPs in order to identify MCPs that match the template attributes. When a sufficient number of MCPs match the attribute set of a template, the method of some embodiments defines a template instance by reference to the matching MCPs.

In some embodiments, the method can define multiple template instances for a template. For instance, in some embodiments, the templates include (1) location-bounded templates (e.g., videos and/or photos captured within a region with a particular radius), (2) time-bounded templates (e.g., videos and/or photos captured within a particular time range and/or date range), (3) time-bounded and location-bounded templates (e.g., mornings at a beach), (4) content-defined templates (e.g., videos and/or photos containing smiles), and (5) user-metadata based templates (e.g., MCPs from albums created by the user, MCPs shared by a user with others, MCPs having particular user-defined metadata tags, etc.).

In these embodiments, one or more of these templates might result in multiple template instances. For example, a time and location-bounded template might be defined in terms of (1) a time range tuple specifying 12 pm to 4 pm, (2) a day range tuple specifying Sunday, and (3) a location tuple specifying a region that is not associated with the home or work location of a user of the device executing the application. For this template, the method might identify multiple template instances that include different sets of MCPs that are captured at different locations on Sunday afternoons, with different template instances corresponding to different regions. In some embodiments, the time-bounded attributes require the MCPs to be captured within a certain temporal range of each other (e.g., all MCPs captured from 12 pm-4 pm on Saturdays).

After defining multiple template instances, the method in some embodiments generates a UI layout that includes an arrangement of a set of summary panes for some or all of the template instances. In some embodiments, the UI layout concurrently displays the summary panes of only a subset of the defined template instances. For example, in some embodiments, the method computes a score for each defined template instance, ranks the defined template instances based on the generated scores, and then generates the UI layout based on the rankings. In some embodiments, the UI layout concurrently shows summary panes for only a certain number of the highest-ranking template instances. In other embodiments, the UI layout concurrently show summary panes for only template instance with generated scores that exceed a certain minimum threshold. The method in some of these embodiments provide controls for allowing a user to view summary panes for other defined template instances that the method does not initially display with other summary panes in the generated UI layout.

In different embodiments, the method generates the scores for the template instances differently. In some embodiments, a template instance's score is based on (1) contextual attributes that relate to the time at which the UI layout is being generated and/or displayed, and (2) quality and/or quantity attributes that relate to quality and/or quantity of the MCPs of the template instance. Different contextual attributes can be used in different embodiments. Examples of contextual attributes include (1) time, (2) location of the device, (3) location of future calendared events stored on, or accessible by, the device, (4) locations derived from electronic tickets stored on the device, etc.

In some embodiments, the contextual attributes are used to derive template-instance scores in order to identify template instances that would be relevant (interesting) to a user (e.g., at the time that the generated UI layout will be displayed). For instance, in some embodiments, the method can identify a future location of the device's user from the time and location of an event scheduled in a calendar application, or specified by an electronic ticket application, executing on the device. As the time approaches to the time of the calendared or ticketed event, the method increases the score of a template instance that is associated with the location of the event based on an assumption that the user would want to see MCPs previously captured at that location.

As mentioned above, each template instance's score in some embodiments also depends on the quality and/or quantity attributes of the MCPs of the instance. Some embodiments account for quantity of MCPs in an instance based on an assumption that a larger quantity signifies a higher level of interest in template instance. For example, a template instance that has a lot of photographs in one location on one particular day would typically signify that at an interesting event took place at that location on that particular day and the user would hence be more interested in seeing the photos form that event.

However, in some embodiments, the method discards duplicative or nearly duplicative MCPs (e.g., keeps only one photo when multiple identical or nearly identical photos exist) from a template instance or before their inclusion in the template instance because often having multiple such photos does not lead to an interesting composite presentation. On the other hand, the method in some cases maintains multiple photos from a burst-mode sequence so that the composite presentation can provide interesting burst-mode photo treatments. In some embodiments, the method also discards certain MCPs that are deemed not to be interesting (e.g., pictures of receipts, screenshot photos, etc.) or not to be useful (e.g., very blurry photos, etc.). These MCPs are filtered out in some embodiments before the template instances are created. In other words, these MCPs are never associated with template instances in some embodiments.

In some embodiments, each template instance's score accounts for the quality of the instance's MCPs based on an assumption that template instances with better content will result in better-generated composite presentations and thereby in composite presentations that are more interesting to the viewer. Different embodiments score the MCPs based on different criteria. For instance, some embodiments generate an intrinsic score for an MCP based on one or more of the following MCP attributes and/or metadata: focus, blur, exposure, camera motion, voice content, face content, user input and/or behavior (e.g., user tags, user's inclusion in albums, user sharing with others, etc.). Some embodiments also score specialty MCP types (e.g., burst-mode photos, slow-motion videos, time-lapsed videos, etc.) higher than other MCP types (e.g., still photographs). Some embodiments also score MCPs that are captured at locations that are not associated with the device user's home or work higher than MCPs captured at home or work.

In some embodiments, the method also computes an extrinsic score for each MCP in a template instance that quantify the temporal and visual distances between two successive MCPs in a presentation order, which define how the MCPs are to be presented in the composite presentation of the template instance. The method then uses this score to define an order for selecting a subset of the MCPs for the composite presentation. For instance, some embodiments use the computed extrinsic scores along with the computed MCP intrinsic scores to select highest scoring MCPs (i.e., best quality MCPs) that provide the most visually unique combination of MCPs. The extrinsic score in some embodiments is a time-and-difference distance between neighboring MCPs in the presentation order. In some embodiments, the time-and-difference distance is a weighted aggregation (e.g., sum) of a time distance and a difference distance between the two MCPs.

As mentioned above, the method in some embodiments generates the arrangement of the summary panes for some of the generated template instances based on the scores computed for the template instances. The summary panes display information about the template instances. In some embodiments, a template instance's summary pane includes one or more thumbnails of one or more MCPs of the instance, and a title. Some embodiments generate the thumbnails from the highest scoring MCPs of the instances. Some embodiments also derive the title for an instance's pane from MCP attributes (e.g., MCP metadata such as location, or MCP content such as smiles, etc.) that associates the MCPs into one template instance.

After a user selects the summary pane for a template instance, the method in some embodiments generates the definition of the composite presentation, and then renders the composite presentation from this definition. In some embodiments, the presentation definition includes the identity of the instance's MCPs that are included in the presentation, the presentation order for the included MCPs, and the list of edit operations (e.g., transition operations, special effects, etc.) that are to be performed to generate the composite presentations from the MCPs.

In some embodiments, the method generates some or all of the MCPs that are included in a template instance's composite presentation from the MCPs of the template instance. For instance, multiple MCPs of the template instance can be still photos. For some or all of these still photos, the method generates a video clip in the composite generation by specifying a Ken Burns effect for each of these photos. Also, from a video clip MCP of a template instance, the method can extract one or more video clips to include in the composite presentation. Similarly, from an MCP that is a burst-mode sequence, the method can extract one or more still photos of the sequence and/or one or more Ken-Burns type video clips for one or more of the still photos of the sequence. Many other examples of deriving the composite-presentation MCPs from a template instance's MCPs exist.

Instead of defining the composite presentation for a template instance after a user selects the summary pane for the template instance in the UI layout, the method of some embodiments defines the composite presentation before the UI layout is generated. In some of these embodiments, the method generates a score for each defined composite presentation, and then uses the generated scores for all of the defined composite presentations to define and arrange the UI layout For instance, in some embodiments, the method uses the generated composite-presentation scores to identify the subset of composite presentations that should initially be concurrently represented on the UI layout, and to identify the order of summary panes for these composite presentations on the UI layout.

In some of these embodiments, the composite presentations are rendered after the user selects their respective summary panes on the UI layout. Other embodiments render the composite presentations before generating the UI layout. One of ordinary skill will realize that other embodiments perform these operations in different sequences. For instance, some embodiments define a portion of a composite presentation before the UI layout is generated, and then generate the rest of the definition of the composite presentation after the UI layout is generated.

The composite presentation generation of some embodiments has several novel features. For instance, the method of some embodiments generates composite presentations by selecting a blueprint for the composite presentation. In some embodiments, the blueprint describes the desired transitions, effects, edit styles (including pace of the edits), etc. Blueprint can also specify the desired type of presentation, which can then influence the type of MCPs included or emphasized in the composite presentation. For example, one blueprint might specify highlights as the desired type of presentation, while another blueprint might specify retrospective as the desired type. For highlights, the method's composite generation would select the best MCPs that are representative of the MCPs of the template instance. For retrospectives, the method's composite generation would might select the MCPs that are not necessarily of the whole set of MCPs of the template instance.

For a template instance, the blueprint in some embodiments is associated with the template of the template instance. Alternatively, or conjunctively, the blueprint in some embodiments is associated with a mood that the method automatically picks for the composite presentation. In some embodiments, the mood is an adjective that describes the type of composite presentation. Examples of mood include extreme, club, epic, uplifting, happy, gentle, chill, sentimental, dreamy, etc. In some embodiments, the method automatically picks the mood for a composite presentation based on the type and/or duration of media in the template instance, content analysis on this media (e.g., detection of high motion video), and detected user-mood preferences. Also, in some embodiments, the method allows the mood to be modified for a composite presentation. In some of these embodiments, the method re-generates the composite presentation for a template instance after the user modifies the mood for a generated composite presentation. Some embodiments allow the user to view the mood for a template instance represented by a summary pane on the generated UI layout. If the user modifies the mood for the represented template instance, the method generates the composite presentation for this template instance based on the user change.

The composite presentation generation of some embodiments automatically specifies the duration for the composite presentation. In some of these embodiments, the method specifies the duration based on the amount of high-quality, unique content in the template instance and the blueprint. For instance, after defining the above-described selection order based on the time-and-difference distance values, the method selects the MCPs in the template instance up to the position in the selection order where two successive MCPs are within a certain distance of each other (e.g., within 0.25 unit time-and-difference distance of each other). The blueprint's specified parameters (e.g., parameters specifying ideal duration for the MCPs) along with the selected MCPs determine the desired duration of the composite presentation. In some embodiments, the blueprint might also specify how the MCPs should be selected, e.g., by specifying selection criteria (such as degree of difference), specifying the manner for computing the time-and-difference distance values are calculated, etc.

The method of some embodiments allows the user to modify a presentation duration that the method initially computes. For instance, in some embodiments, the user can modify the presentation duration after being presented with a rendered composited presentation. Alternatively, or conjunctively, the method allows the user to view and modify the presentation duration in the generated UI layout (e.g., as part of the information provided by a template instance's summary pane), without having to first view the rendered composite presentation with this duration.

In some embodiments, the composite presentation generation has novel media compositing operations, novel song compositing operations, and novel interplay between the media and song compositing operations. The method of some embodiments uses a constrained solver that generates the composite presentation definition by exploring different manners for combining the MCPs of a template instance based on (1) a set of constraints that limit the exploration of the solution space, and (2) metadata tags that specify content characteristics (e.g., for a photo, or for ranges of frames of a video). Examples of constraints include duration constraints (e.g., ideal, minimum and maximum durations for each MCP type) and positional constraints (e.g., one MCP type cannot be placed next to another MCP type).

In exploring the solution space to find an optimal solution that satisfies the constraint and meets one or more optimization criteria, the constrained solver in some embodiments preferentially costs solutions that use MCPs that are highly ranked in the selection order. Also, in finding the optimal solution, constrained solver in some embodiments (1) identifies different portions of the template instance MCPs (e.g., different segments of the video clips, etc.) based on the metadata tag ranges, and (2) explores solutions based on these identified portions.

In some embodiments, the solver discards MCP segments from an identified solution that are smaller than a certain size. The solver in some embodiments also explores whether an MCP segment in an identified solution should be split into smaller segments in order to delete one or more ranges in the middle of the segment. In some of these embodiments, the solver restarts its search for a solution after deleting smaller resulting segments and/or splitting MCPs into smaller segments.

In some embodiments, the media compositor also specifies Ken-Burns effects for still photos in order to define video presentations for the still photos. The media compositor in some embodiments specifies special treatments for other types of image content (such as burst-mode sequences, slow-motion sequences, time-lapse sequences, etc.) that result in the generation of a video sequence for this type of content. By only using extracted segments of MCPs and by specifying special treatment effects for photos and other type of content, the media compositor generates MCPs for the composite presentation from the MCPs of the template instance.

As mentioned above, the media compositor in some embodiments computes the ideal duration for the composite presentation based on the selection order that it defines using the time-and-difference distance values. In some of these embodiments, the media compositor provides the ideal duration to the song compositor. The song compositor then generates a composite song presentation (to accompany the composite media presentation) that has the ideal duration.

In some embodiments, the song compositor generates the composite song presentation by identifying a sequence of audio segments and defining edits and transitions between each pair of audio segments in the sequence. The audio segments are part of one song in some embodiments. In other embodiments, they can be part of two or more songs. These audio segments are referred to as body segments to signify that they are parts of another song. In some embodiments, body segments are assigned a priority value and a section, and within each of their respective sections, are assigned an order. These values are then used to insert the body segments in a dynamically composited song.

In some embodiments, the song compositor also selects an ending segment from several candidate ending segments for the composite song presentation. The song compositor in some of these embodiments can also select a starting segment from several starting segments for the composite song presentation. An editor defines the body, starting and ending segments from one or more songs by using the audio authoring tools of some embodiments.

To ensure that the segments are properly arranged in the composite song presentation, the song compositor of some embodiments uses (1) insertion rules that specify how audio segments can be inserted in an audio sequence, and (2) sequence rules that ensure that the inserted audio segments can neighbor other segments in the sequence. In some embodiments, the song compositor iteratively inserts body segments into a candidate audio sequence by stepping through the body segments based on their assigned priority values, and inserting the body segments into the candidate audio sequence based on their duration and the insertion rules. In some embodiments, the insertion rules specify (1) that a body segment that belongs to a subsequent second section cannot be inserted before a body segment that belong to an earlier first section, and (2) that body segments that belong to the same section be placed next to each other based on their order in their respective section.

The song compositor of some embodiments then uses the sequence rules to validate the body segment arrangement in the audio sequence. This validation entails ensuring that the placement of no two neighboring segments in the audio sequence violates a sequence rule. When a neighboring segment pair violates a sequence rule, the compositor removes the segment with the lower priority to cure the violation in some embodiments.

In some embodiments, these sequence rules are embedded in a jump table that has multiple rows and columns, and each audio segment is associated with one row and one column. In some embodiments, each starting or ending segment is also associated with at least one row or one column. Each jump table cell then specifies whether the two segments that are assigned to that cell's row and column are allowed to follow each other in an order specified by the row and column assignment. An editor uses the authoring tool of some embodiments to specify the jump table and its attributes for the body, starting and ending segments that the editor defines. At runtime, the song compositor then uses this jump table to automatically define a song for a duration specified by the media compositor.

In some embodiments, each jump table cell also specifies whether a transition is required at the transition between the two segments. The jump table also specifies (1) a priority value for each body segment and (2) an identifier for indicating whether the body segment can be sliced during the song compositing. In some embodiments, the song compositor inserts body segments in a presentation order based on the segment priority values and based on a set of insertion rules, until a particular duration is reached. This duration in some embodiments is the ideal duration provided by the media compositor minus the duration of the longest ending segment. After arranging the body segments, the song compositor adds an ending segment, and when the audio sequence is still shorter than the desired duration, a starting segment if one segment is available that would not make the sequence duration exceed the desired duration.

In some embodiments, the media compositor and song compositor have several novel interactions. The first is the media compositor automatically generates a desired presentation duration, and the song compositor dynamically generates a definition of a composite song presentation based on this duration, as described above. Another novel interaction is that in some embodiments the song compositor provides the location of the ending segment, and/or location of a stinger in the ending segment, to the media compositor so that the media compositor can align the start of the last video or image segment with the ending segment or stinger in this segment. In some embodiments, the video and song compositors also synchronize fade-out effects that they apply to their respective presentations with each other.

Also, in some embodiments, the media compositor performs post-processing to align edit points in the composite media to certain audibly discernable transition locations in the composite song. These locations in some embodiments include location of beats, locations of onsets, locations of segment boundaries, and location of ending-segment stinger in the composite definition. An audio onset corresponds to the beginning of a musical note at which the amplitude rises from zero to a peak. A beat is the rhythmic movement at which the song is played.

In some embodiments, the media compositor directs the song compositor to identify one or more audibly discernable transition locations in the composite song near a particular time in the presentation. In some of these embodiments, the song compositor returns (1) a list of such location that are near the particular time, and (2) a priority for each of these locations. The media compositor then uses this list of transitions to align an edit point in the composite media's definition to a transition location based the specified priority value(s) and the degree to which the media edit has to be moved to reach the transition location.

In some embodiments, the compositing application that implements the above-described method executes on a mobile device. This application only requires a user of a mobile device to capture photos and videos at different events. Once the user has captured photos and videos, the application can automatically group the content that was captured together, associate the group content with a location or event, present each defined group to the user, and to display a composite presentation for the group upon the user's selection of the group. For instance, when a user goes to an event (e.g., baseball game) and takes pictures and videos at the stadium, the mobile device can automatically group these pictures and videos, create a composite presentation from them, and provide the composite presentation to the user after the user leaves the game. Similarly, photos and videos from vacations (e.g., trips to Hawaii) can be grouped together, put in a composite presentation, and provided to users after their vacations ends.

BRIEF DESCRIPTION OF DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a media-compositing application that automatically organizes media content pieces (MCPs) that are stored on, and/or accessible by, a device into different groups, and produces a user interface (UI) layout that identifies the defined MCP groups as groups for which the application can display composite presentations (e.g., video presentations). In some embodiments, the application groups the MCPs by performing an automated process that is not triggered by a user request to group the MCPs. To group the MCPs, the application's automated process uses multiple grouping templates (templates), with each specifying a set of media attributes that are to be compared with the MCP content and/or attributes to group the MCPs.

In some embodiments, the generated UI layout includes summary panes for some, but not all, of the defined MCP groups. For instance, in some embodiments, the UI layout at any given time includes summary panes for the MCP groups that would be contextually most relevant to a user of the device at that time. However, in some embodiments, the application provides controls for allowing a user to view summary panes for other defined MCP groups that the application does not initially display with other summary panes in the generated UI layout. When a user selects a summary pane for an MCP group, the application displays a composite presentation that it generates from the group's MCPs without receiving any other user input.

Figure 1:
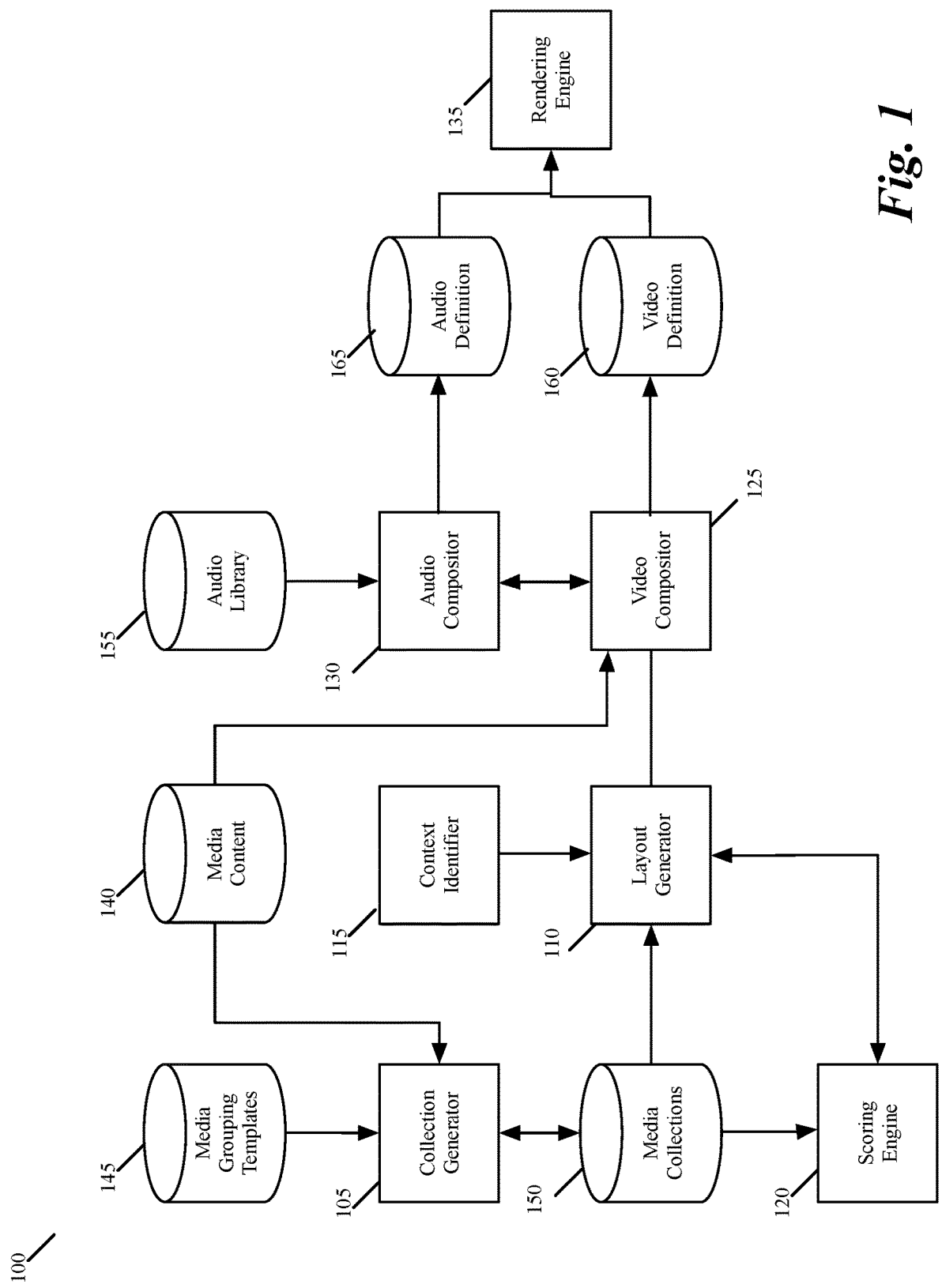
FIG. 1 conceptually illustrates a media-compositing application of some embodiments.

FIG. 1 illustrates one such media-compositing application 100. This application executes on a device that stores MCPs (e.g., videos, still images, etc.), and/or has access through a network to MCPs stored on other computing devices. This device is a computer (e.g., server, desktop or laptop), or a mobile device (such as a smartphone or tablet). As shown, this application includes a collection generator 105, a layout generator 110, a context identifier 115, a scoring engine 120, a media compositor 125, a song compositor 130, and a rendering engine 135. To perform their operations, these modules of the application access media content storage 140, template storage 145, media collection storage 150, audio storage 155, composite-video storage 160, composite-audio storage 165.

In some embodiments, the collection generator 105 and layout generator 110 perform an automated process that (1) analyzes the MCPs (e.g., analyzes the content and/or metadata of the MCPs) to define one or more MCP groups, and (2) produces a user interface (UI) layout that identifies the defined MCP groups as groups for which the application can display composite presentations (e.g., video presentations). In performing their operations, these modules in some embodiments use the scoring engine 120 and the context identifier 115.

More specifically, to define the MCP groups, the collection generator 105 in some embodiments uses one or more media grouping templates (templates) in the template storage 145 to try to associate each MCP stored in the media content storage 140 with one or more template instances. In some embodiments, the media content storage 140 is a data storage (e.g., a database) of the device that executes the application. In other embodiments, some or all of this storage 140 resides on a separate device (e.g., another computer, server, mobile device, etc.).

In some embodiments, a template in the template storage 145 is defined by reference to a set of media matching attributes. The collection generator 105 compares a template's attribute set with the content and/or metadata of the MCPs in order to identify MCPs that match the template attributes. When a sufficient number of MCPs match the attribute set of a template, the application of some embodiments defines a template instance by reference to the matching MCPs, and stores this template instance in the media collection storage 150. In some embodiments, a template instance includes a list of MCP identifiers that identify the MCP's that matched the instance's template attribute set.

In some embodiments, the collection generator 105 can define multiple template instances for a template. For instance, in some embodiments, the templates include (1) location-bounded templates (e.g., videos and/or photos captured within a region with a particular radius), (2) time-bounded templates (e.g., videos and/or photos captured within a particular time range and/or date range), (3) time-bounded and location-bounded templates (e.g., mornings at a beach), (4) content-defined templates (e.g., videos and/or photos containing smiles), and (5) user-metadata based templates (e.g., MCPs from albums created by the user, MCPs shared by a user with others, MCPs having particular user-defined metadata tags, etc.).

The collection generator 105 stores the definition of the template instances that it generates in the media collection storage 150. In some embodiments, the generator repeats its grouping operation in order to update the template instance definitions in the media collection storage 150. For instance, in some embodiments, the generator repeats its grouping operation periodically, e.g., every hour, six hours, twelve hours, twenty four hours, etc. Conjunctively, or alternatively, the generator 150 in some embodiments performs its grouping operation whenever the application opens and/or based on user request.

Also, in some embodiments, the collection generator 105 performs its grouping operation each time a new MCP is stored, or a certain number of MCPS are stored, in the media content storage 140. For example, in some embodiments, the application 100 executes on a mobile device that captures a variety of image content data (e.g., still photos, burst-mode photos, video clips, etc.). Each time the mobile device captures an MCP (e.g., a photo, a video clip, etc.), the collection generator 105 in some embodiments tries to associate the captured MCP with one or more template instances, provided that the application is running in the foreground or background at that time.

Based on template definition, layout generator 110 in some embodiments generates UI layouts that identify the defined template instances as MCP groups for which the application can display composite presentations (e.g., video presentations). At any given time, the layout generator 110 of some embodiments generates a UI layout that identifies a subset of the defined template instance that would be contextually relevant to a user of the device at that time. As further described below, this is based on the contextual attributes provided by the context identifier 115 and template instance scores computed by the scoring engine 120.

Figure 2:
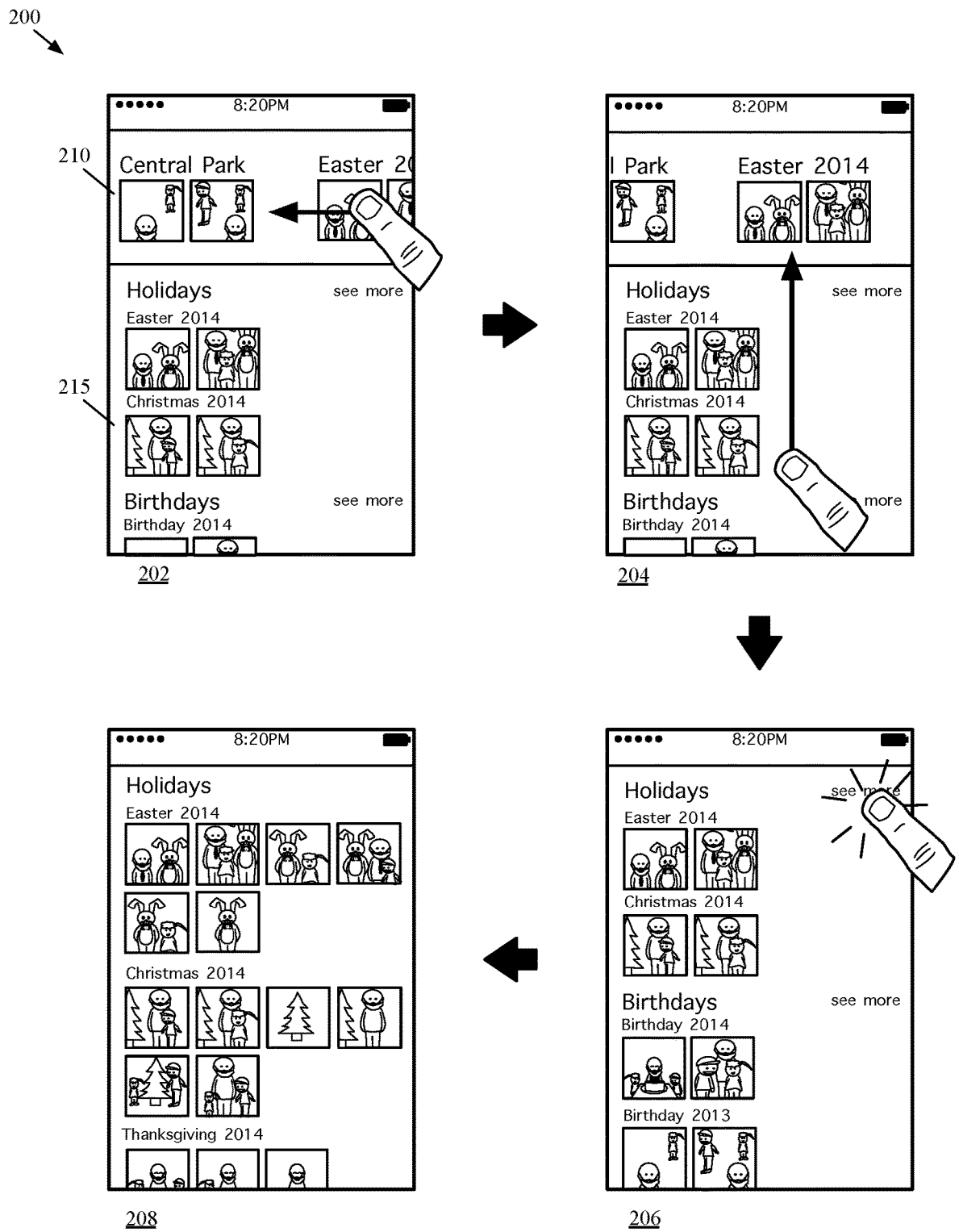
FIG. 2 illustrates an example of a layout generated by a layout generator.

FIG. 2 illustrates an example of a UI layout 200 generated by the layout generator 110. In this example, the UI layout is displayed on a display screen of a mobile device 100 that executes the application of some embodiments. Also, this example is illustrated in terms of four stages 202-208 that show different aspects of this UI layout presentation.

As shown, the UI layout concurrently displays several summary panes 205 for a subset of template instances that are defined at a particular time. Each summary pane 205 displays information about its associated template instance.

In this example, a template instance's summary pane includes a title plus one or more thumbnails of one or more MCPs of the instance. The layout generator 110 in some embodiments derives a summary pane's (1) title from the attribute set (e.g., MCP metadata such as location, or MCP content such as smiles, etc.) of the pane's instance, and (2) thumbnails from one or more of the better quality MCPs of the pane's instance. In some embodiments, the scoring engine 120 generates a score for each MCP to quantify its quality. This scoring will be further described below.

As further shown, the UI layout 200 has two different display sections 210 and 215. The first display section 210 displays summary panes for template instances that are deemed to be contextually relevant to a user of the device at that time, while the second display section 215 displays summary panes for different categories of template instances. In this example, two or more template instances belong to one category when they are derived from one media grouping template. Also, in this example, each category is identified by a category heading at the top of the summary panes for the template instances of that category. In this example, the categories are Holidays, Birthdays, Vacations, and Parks.

The first and second stages 202 and 204 of FIG. 2 illustrate that the user can scroll through the summary panes in the first section 210 by performing horizontal drag (left or right) operations, which are enabled by a touch-sensitive display screen of the mobile device 100. The second and third stages 204 and 206 illustrates that the user can scroll through the summary panes in the second section 215 by performing vertical touch drag (up or down) operations.

The third and fourth stages 206 and 208 illustrate that the second display section 215 initially displays summary panes only for the better quality template instances in each category. Specifically, the third stage 206 shows that the user can view all template instances created for a category by selecting a "See More" control 230 that appears above the summary panes for the Holidays category. The fourth stage 208 shows that this selection causes the UI layout to expand the space for the Holidays category to reveal additional summary panes for additional Holidays template instances.

Accordingly, in the example illustrated in FIG. 2, the UI layout not only provides a first section that displays summary panes for template instances that are deemed to be contextually more relevant than template instances at a given time, but also limits the summary panes displayed in the second section to those that are the best ones in their respective categories. One of ordinary skill will realize that the UI layout of FIG. 2 is just one exemplary UI layout design. Other embodiments display, arrange, and/or nest the summary panes differently. Also, other embodiments provide different kinds of information for each summary pane.

To assess whether one template instance is contextually more relevant than, and/or better than, another one template instance at a particular time, the layout generator has the scoring engine 120 generates a score for each template instance, ranks the template instances based on the generated scores, and then generates the UI layout based on the rankings. In some embodiments, the UI layout concurrently shows summary panes for only a certain number of the highest-ranking template instances. In other embodiments, the UI layout concurrently show summary panes for only template instance with generated scores that exceed a certain minimum threshold.

In different embodiments, the scoring engine 120 generates the scores for the template instances differently. In some embodiments, a template instance's score is based on (1) contextual attributes that relate to the time at which the UI layout is being generated and/or displayed, and (2) quality and/or quantity attributes that relate to quality and/or quantity of the MCPs of the template instance. Different contextual attributes can be used in different embodiments. Examples of contextual attributes include (1) time, (2) location of the device, (3) location of future calendared events stored on, or accessible by, the device, (4) locations derived from electronic tickets stored on the device, etc.

In some embodiments, the context identifier 115 periodically collects such contextual attributes from one or more services modules executing on the device. Examples of these service modules include location service modules, such as GPS modules, or other location modules (e.g., frameworks) that generate the location data from multiple location determining services. The service modules also include in some embodiments one or more location prediction engines that formulate predictions about future locations of the device (1) based on events scheduled in a calendar application, or specified by an electronic ticket application, executing on the device, and/or (2) based on past locations of the device (e.g., locations associated with regions in which the device previously stayed more than a threshold amount of time). These services in some embodiments are framework level services.

In addition to, or instead of, periodically collecting such contextual attributes periodically, the context identifier 115 in some embodiments collects these attributes on-demand based on requests from the layout generator 110. The layout generator 110 passes the contextual attributes that it receives to the scoring engine 120, which then uses these attributes to derive template-instance scores in order to identify template instances that would be relevant (interesting) to a user (e.g., at the time that the generated UI layout will be displayed).

For instance, in some embodiments, the application can identify a future location of the device's user from the time and location of an event scheduled in a calendar application, or specified by an electronic ticket application, executing on the device. As the time approaches to the time of the calendared or ticketed event, the application increases the score of a template instance that is associated with the location of the event based on an assumption that the user would want to see MCPs previously captured at that location.

Figure 3:
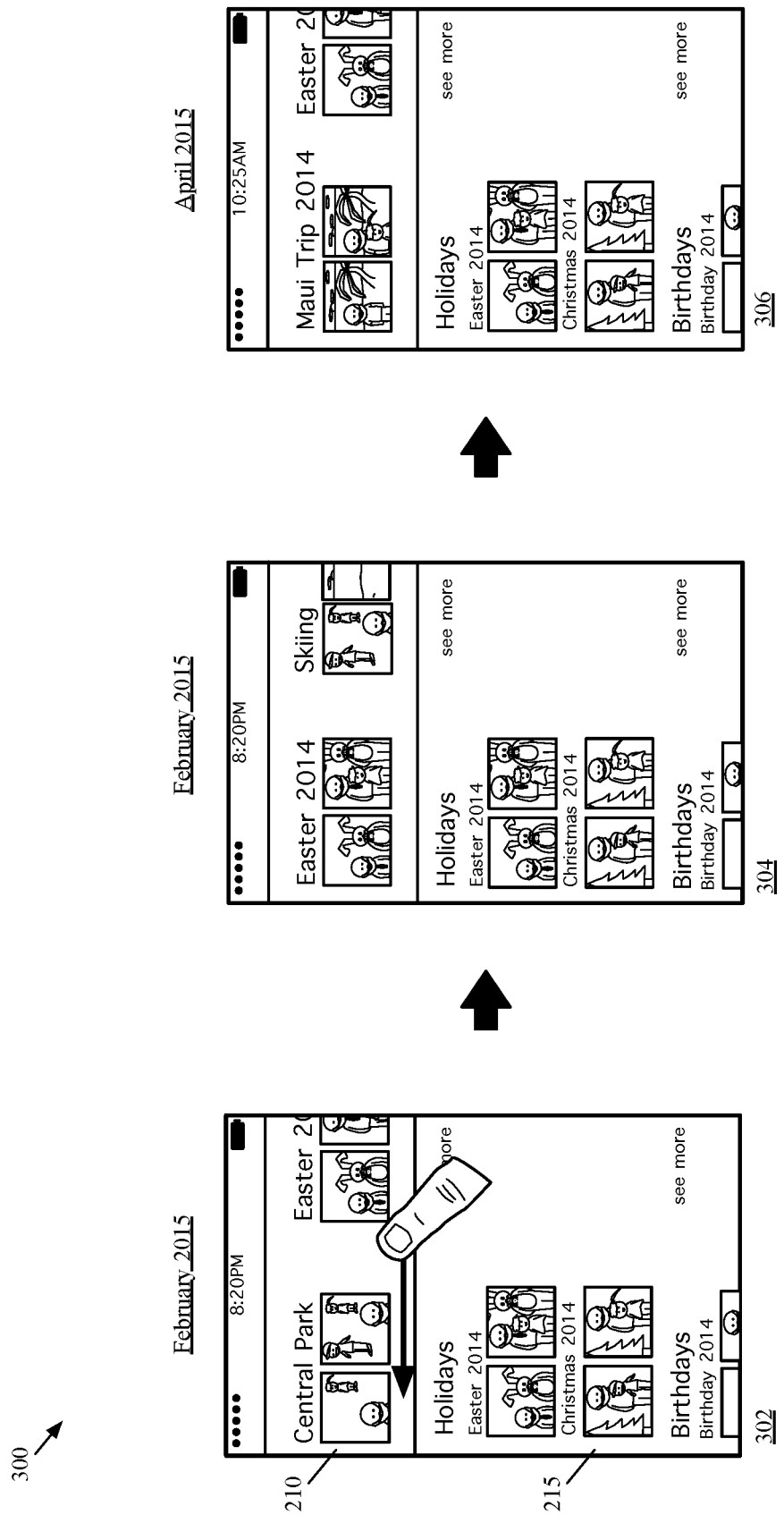
FIG. 3 illustrates an example of arranging template instance summary panes in some embodiments.

FIG. 3 illustrates an example that illustrates how the layout generator in some embodiments arranges the template instance summary panes based on their contextual relevance. This example is illustrated in three operational stages 302-306 of the mobile device 100. The first and second stages 302 and 304 illustrate the user scrolling through the UI layout 200 that has multiple summary panes in the first and second display sections 210 and 15. The second stage 304 illustrates that one of summary pane categories towards the bottom of the second display section 210 is a category for vacation, and that one vacation summary pane relates to Maui Spring 2014. The first and second stages 302 and 304 also show that the user is scrolling through the UI layout 200 during these stages in the February of 2015.

The third stage 306 illustrates a UI layout 300 that the layout generator generates in April 2015. In this UI layout 300, the layout generator has moved the Maui Spring 2014 template instance to the first display section 210, in order to present this collection as one of the featured collections for which it can automatically generate a composite presentation. The layout generator 110 does this in some embodiments because it detects that an electronic ticketing application executing on the device has an electronic ticket to Hawaii in the near future, and then determines that it has previously defined a template instance that includes the media content from the last Maui trip.

In this example, the contextual attributes that the layout generator passes to the scoring engine, and that the scoring engine uses in its soring calculation to generate a high score for the Maui collection, include the destination location of the ticket and the date of the trip. In some embodiments, only the destination location or only the date from the ticket might be enough to move the Maui collection up the generated UI layout.

Also, in the example of FIG. 3, the Maui collection moves from the second display section to the first display section. In some embodiments, the layout generator emphasizes a summary pane by just moving it up in the second display section, or by relocating it to a different position in the first display section. In addition, the layout generator can redefine the UI layout at a much greater frequency than that illustrated in FIG. 3. For example, in some embodiments, the layout generator refreshes the UI layout based on a predicted destination of the device as the device is traveling to a new destination (e.g., in a car). Alternatively, or conjunctively, the layout generator in some embodiments refreshes the UI layout when a user leaves a region, in which the user captured a number of MCPs with the camera of the mobile device that executes the application of some embodiments.

In some embodiments, each template instance's score can depend on the quality and/or quantity attributes of the MCPs of the instance. In some embodiments, the scoring engine 120 generates a score for a template instance that accounts for quantity of MCPs in the instance based on an assumption that a larger quantity signifies a higher level of interest in the template instance. For example, a template instance that has a lot of photographs in one location on one particular day would typically signify that at an interesting event took place at that location on that particular day and the user would hence be more interested in seeing the photos form that event.

However, in some embodiments, the collection generator 105 discards duplicative or nearly duplicative MCPs (e.g., keeps only one photo when multiple identical or nearly identical photos exist) from a template instance or before their inclusion in the template instance because often having multiple such photos does not lead to an interesting composite presentation. On the other hand, the collection generator 105 in some cases maintains multiple photos from a burst-mode sequence so that the composite presentation can provide interesting burst-mode photo treatments. In some embodiments, the collection generator 105 also discards certain MCPs that are deemed not to be interesting (e.g., pictures of receipts, screenshot photos, etc.) or not to be useful (e.g., very blurry photos, etc.). These MCPs are filtered out in some embodiments before the template instances are created. In other words, these MCPs are never associated with template instances in some embodiments.

In some embodiments, each template instance's score accounts for the quality of the instance's MCPs based on an assumption that template instances with better content will result in better-generated composite presentations and thereby in composite presentations that are more interesting to the viewer. In different embodiments, the scoring engine 120 scores the MCPs based on different criteria. For instance, in some embodiments, the scoring engine generates an intrinsic score for an MCP based on one or more of the following MCP attributes and/or metadata: focus, blur, exposure, camera motion, voice content, face content, user input and/or behavior (e.g., user tags, user's inclusion in albums, user sharing with others, etc.). Some embodiments also score specialty MCP types (e.g., burst-mode photos, slow-motion videos, time-lapsed videos, etc.) higher than other MCP types (e.g., still photographs). Some embodiments also score MCPs that are captured at locations that are not associated with the device user's home or work higher than MCPs captured at home or work.

In some embodiments, the collection generator 105 uses the MCP intrinsic scores to filter out some of the MCPs before or after their inclusion in a template instance. In these embodiments, the collection generator 105 uses the scoring engine 120 to compute these scores. The scoring engine in some embodiments includes different scoring modules for computing different types of scores, e.g., MCP scores, context-based instance scores, quality-based instance scores, quantity-based instance scores, etc. In some embodiments, one or more of these scores (e.g., MCP scores) are provided by one or more framework services of the device. Alternatively, or conjunctively, the framework services in some embodiments provide metadata tags that characterized different characteristics of the MCPs, and these metadata tags are used to compute some or all of the scores.

In addition to the intrinsic scores, the scoring engine 120 computes extrinsic scores in some embodiments that express a quality of one MCP by reference to one or more other MCPs. For instance, in some embodiments, the scoring engine 120 computes extrinsic scores in order to define a selection order for the MCPs in a template instance. In some of these embodiments, the computed extrinsic scores quantify the temporal and visual distances between two successive MCPs in the selection order, as further described below.

When a user selects the summary pane for a template instance, the layout generator in some embodiments directs the media compositor 125 and the song compositor 130 to generate, for the selected template instance, the definitions of media and song presentations, which the rendering engine 135 renders to produce a composite presentation for display. The media compositor 125 in some embodiments generates the definition of the composite media presentation from the MCPs of the template instance.

In generating this definition, the media compositor uses the selection order that was computed by using the extrinsic scores, to select only a subset of the MCPs of the template instance. For instance, after the selection order is defined based on the time-and-difference distance values, the video-compositor of some embodiments selects the MCPs in the template instance up to the position in the selection order where two successive MCPs are within a certain distance of each other (e.g., within 0.25 unit time-and-difference distance of each other).

In some embodiments, this selection then allows the media compositor to automatically define the duration of the composite presentation without any user input. For instance, some embodiments compute the duration as the sum of the ideal duration of each MCP in the subset of selected MCPs. In some embodiments, each MCP has an MCP type, and the MCP's ideal duration is the ideal duration that is defined by its type. The computation of the ideal presentation duration will be further described below.

In other embodiments, the media compositor selects a duration for the composite presentation, and then uses the selection order to select the N highest ranking MCPs according to the selection order. Thus, these embodiments use the duration is used to identify the MCPs to select according to the selection order, while other embodiments use the selection order to define the presentation duration. However, given that both of these approaches in some embodiments rely on a selection that is based on computed time-and-difference distance scores, they ensure that the MCPs that remain in the template instance are the best quality MCPs that provide a visually unique combination of MCPs.

In some embodiments, the definition of the composite media presentation includes the identity of the instance's MCPs that are included in the presentation, the presentation order for the included MCPs, and the list of edit operations (e.g., transition operations, special effects, etc.) that are to be performed to generate the composite presentations from the MCPs. In some embodiments, the MCPs of the composite media presentation can be identical to the MCPs of the template instance, or they can be MCPs that the media compositor derives from the instance's MCPs.

For instance, multiple MCPs of the template instance can be still photos. For some or all of these still photos, the media compositor 125 generates a video clip in the composite generation by specifying a Ken Burns effect for each of these photos. Also, from a video clip MCP of a template instance, the application can extract one or more video clips to include in the composite presentation. Similarly, from an MCP that is a burst-mode sequence, the media compositor 125 can extract one or more still photos of the sequence and/or one or more Ken-Burns type video clips for one or more of the still photos of the sequence. Many other examples of deriving the composite-presentation MCPs from a template instance's MCPs exist.

In some embodiments, the media compositor generates composite media definition by selecting a blueprint for the composite presentation. In some embodiments, the blueprint describes the desired transitions, effects, edit styles (including pace of the edits), etc. Blueprint can also specify the desired type of presentation, which can then influence the type of MCPs included or emphasized in the composite presentation. For example, one blueprint might specify highlights as the desired type of presentation, while another blueprint might specify retrospective as the desired type. For highlights, the collection generator 105 or media compositor 125 in some embodiments selects the best MCPs that are representative of the MCPs of the template instance. For retrospectives, the collection generator 105 or media compositor 125 selects in some embodiments the MCPs that are not necessarily of the whole set of MCPs of the template instance.

In some embodiments, the blueprint also determines the duration of the composite presentation that the media compositor 125 automatically generates. In some of these embodiments, the application specifies the duration based on the amount of high-quality, unique content in the template instance and the blueprint. For instance, in some embodiments, the blueprint's specified parameters (e.g., parameters specifying ideal duration for the MCPs) along with the MCPs that are selected based on the selection order, determine the desired duration of the composite presentation. In some embodiments, the blueprint might also specify other parameter, such as the way the extrinsic scores are computed, etc.

For a template instance, the blueprint in some embodiments is associated with the template of the template instance. Alternatively, or conjunctively, the blueprint in some embodiments is associated with a mood that the application (e.g., the collection generator 105 or media compositor 125) automatically picks for the composite presentation. In some embodiments, the mood is an adjective that describes the type of composite presentation. Examples of mood include extreme, club, epic, uplifting, happy, gentle, chill, sentimental, dreamy, etc.

In some embodiments, the application 100 (e.g., the collection generator 105 or media compositor 125) automatically picks the mood for a composite presentation based on the type and/or duration of media in the template instance, content analysis on this media (e.g., detection of high motion video), and detected user-mood preferences. Also, in some embodiments, the application allows the mood to be modified for a composite presentation. In some of these embodiments, the video and song compositors 125 and 130 re-generate the composite presentation for a template instance after the user modifies the mood for a generated composite presentation. Some embodiments allow the user to view the mood for a template instance represented by a summary pane on the generated UI layout. If the user modifies the mood for the represented template instance, the video and song compositors 125 and 130 generate the composite presentation for this template instance based on the user change.

The application of some embodiments also allows the user to modify a presentation duration that the application initially computes. For instance, in some embodiments, the user can modify the presentation duration after being presented with a rendered composited presentation. Alternatively, or conjunctively, the application allows the user to view and modify the presentation duration in the generated UI layout (e.g., as part of the information provided by an instance's summary pane), without having to first view the rendered composite presentation with this duration. Some embodiments also allow the user to modify the MCPs that the collection generator 105 automatically selects for a template instance. In some embodiments, the user can modify the MCPs before and/or after viewing a composite presentation that the video and song compositors 125 and 1350 generate for a template instance that the collection generator 105 generates.

In some embodiments, the media compositor 125 includes a novel constrained solver that generates a composite media definition by exploring different manners for combining the MCPs of a template instance based on (1) a set of constraints that limit the exploration of the solution space, and (2) metadata tags that specify content characteristics (e.g., for a photo, or for ranges of frames of a video). Examples of constraints include duration constraints (e.g., ideal, minimum and maximum durations for each MCP type) and positional constraints (e.g., one MCP type cannot be placed next to another MCP type).

In exploring the solution space to find an optimal solution that satisfies the constraint and meets one or more optimization criteria, the constrained solver in some embodiments preferentially costs solutions that use MCPs that are highly ranked in the selection order. Also, in finding the optimal solution, constrained solver in some embodiments (1) identifies different portions of the template instance MCPs (e.g., different segments of the video clips, etc.) based on the metadata tag ranges, and (2) explores solutions based on these identified portions.

In some embodiments, the solver discards MCP segments from an identified solution that are smaller than a certain size. The solver in some embodiments also explores whether an MCP segment in an identified solution should be split into smaller segments in order to delete one or more ranges in the middle of the segment (e.g., ranges that undesirable content, such as ranges with excessive camera motion, etc., and/or ranges that do not have desirable content, such as ranges that do contain any faces). In some of these embodiments, the solver restarts its search for a solution after deleting smaller resulting segments and/or splitting MCPs into smaller segments.

In some embodiments, the media compositor also specifies Ken-Burns effects for still photos in order to define video presentations for the still photos. The media compositor in some embodiments specifies special treatments for other types of image content (such as burst-mode sequences, slow-motion sequences, time-lapse sequences, etc.) that result in the generation of a video sequence for this type of content. By only using extracted segments of MCPs and by specifying special treatment effects for photos and other type of content, the media compositor generates MCPs for the composite presentation from the MCPs of the template instance.

In some embodiments, the media compositor provides the desired duration of the composite presentation to the song compositor, after this duration from the selection order and/or blueprint. Based on the received desired duration, the song compositor then dynamically defines a composite song presentation to accompany the composite media presentation of the media compositor. This song compositor dynamically defines the song presentation to include several audio segments in a particular sequence, and a set of edits and transitions between the audio segments in the sequence. In some embodiments, the audio segments are part of one song, while in other embodiments, they can be part of two or more songs.

These audio segments are referred to as body segments to signify that they are parts of another song. In some embodiments, the song compositor also selects an ending segment from several candidate ending segments for the composite song presentation. The song compositor in some of these embodiments can also select a starting segment from several starting segments for the composite song presentation. An editor defines the body, starting and ending segments from one or more songs by using the audio authoring tools of some embodiments.

To ensure that the segments are properly arranged in the composite song presentation, the song compositor of some embodiments uses (1) insertion rules that specify how audio segments can be inserted in an audio sequence, and (2) sequence rules for ensuring that the inserted audio segments can neighbor other segments in the sequence. In some embodiments, the insertion rules are defined by reference to audio sections to which each body segments belong. Specifically, in some embodiments, the audio segment editor associates each body segment to one section in a set of sequentially specified sections, and specifies a particular sequential ordering of the body segments in each section. The insertion rules of some embodiments specify that a body segment that belongs to a subsequent second section cannot be inserted before a body segment that belong to an earlier first section. The insertion rules also require that body segments that belong to the same section be placed next to each other based on their order in their respective section.

In some embodiments, these sequence rules are embedded in a jump table that has multiple rows and columns, and each body segment is associated with one row and one column. In some embodiments, each starting or ending segment is also associated with at least one row or one column. Each jump table cell then specifies whether the two segments that are assigned to that cell's row and column are allowed to follow each other in an order specified by the row and column assignment. An editor uses the authoring tool of some embodiments to specify the jump table and its attributes for the body, starting and ending segments that the editor defines. At runtime, the song compositor then uses this jump table to automatically define a song for a duration specified by the media compositor.

In some embodiments, each jump table cell also specifies whether a transition is required at the transition between the two segments. The jump table in some embodiments also specifies (1) a priority value for each body segment and (2) an identifier for indicating whether the body segment can be sliced during the song compositing. In some embodiments, the song compositor inserts body segments in a presentation order based on the segment priority values and based on a set of insertion rules, until a particular duration is reached. This duration in some embodiments is the ideal duration provided by the media compositor minus the duration of the longest ending segment. After arranging the body segments, the song compositor adds an ending segment, and when the audio sequence is still shorter than the desired duration, a starting segment if one segment is available that would not make the sequence duration exceed the desired duration.

In some embodiments, the media compositor 125 and song compositor 130 have several novel interactions. The first is the media compositor automatically generates a desired presentation duration, and the song compositor dynamically generates a definition of a composite song presentation based on this duration, as described above. Another novel interaction is that in some embodiments the song compositor provides the location of the ending segment, and/or location of a stinger in the ending segment, to the media compositor so that the media compositor can align the start of the last video or image segment with the ending segment or stinger in this segment. In some embodiments, the video and song compositors also synchronize fade-out effects that they apply to their respective presentations with each other.

Also, in some embodiments, the media compositor performs post-processing to align edit points in the composite media to certain audibly discernable transition locations in the composite song. These locations in some embodiments include location of beats, locations of onsets, locations of segment boundaries, and location of ending-segment stinger in the composite definition. An audio onset corresponds to the beginning of a musical note at which the amplitude rises from zero to a peak. A beat is the rhythmic movement at which the song is played. An ending segment stinger is a short piece of music in the ending segment that signifies the start of the end of the ending segment.

In some embodiments, the media compositor directs the song compositor to identify one or more audibly discernable transition locations in the composite song near a particular time in the presentation. In some of these embodiments, the song compositor returns (1) a list of such location that are near the particular time, and (2) a priority for each of these locations. The media compositor then uses this list of transitions to align an edit point in the composite media's definition to a transition location based the specified priority value(s) and the degree to which the media edit has to be moved to reach the transition location.

After the media compositor generates a definition of the composite media presentation, and the song compositor generates a definition of the composite song presentation, these modules store the generated media and song presentation definitions respectively in the media and song definition storages 160 and 165. Some embodiments use one storage (e.g., one file) to store both of these definitions. From the storages 160 and 165, the rendering engine 135 retrieves the media and song presentation definitions and generates a rendered composite presentation from these definitions. In some embodiments, the rendering engine 135 stores the rendered composite presentation in a file that it stores on the device, or outputs the rendered composite presentation to a frame buffer of the device for display.

One of ordinary skill will realize that the application 100 in other embodiments operates differently than described above. For instance, instead of defining the composite presentation for a template instance after a user selects the summary pane for the template instance in the UI layout, the application of some embodiments defines the composite presentation before the UI layout is generated. In some of these embodiments, the application generates a score for each defined composite presentation, and then uses the generated scores for all of the defined composite presentations to define and arrange the UI layout. For instance, in some embodiments, the application uses the generated composite-presentation scores to identify the subset of composite presentations that should initially be concurrently represented on the UI layout, and to identify the order of summary panes for these composite presentations on the UI layout. Alternatively, some embodiments render the composite presentations before generating the UI layout. Still other embodiments define a portion of a composite presentation before the UI layout is generated, and then generate the rest of the definition of the composite presentation after the UI layout is generated.

Figure 4:
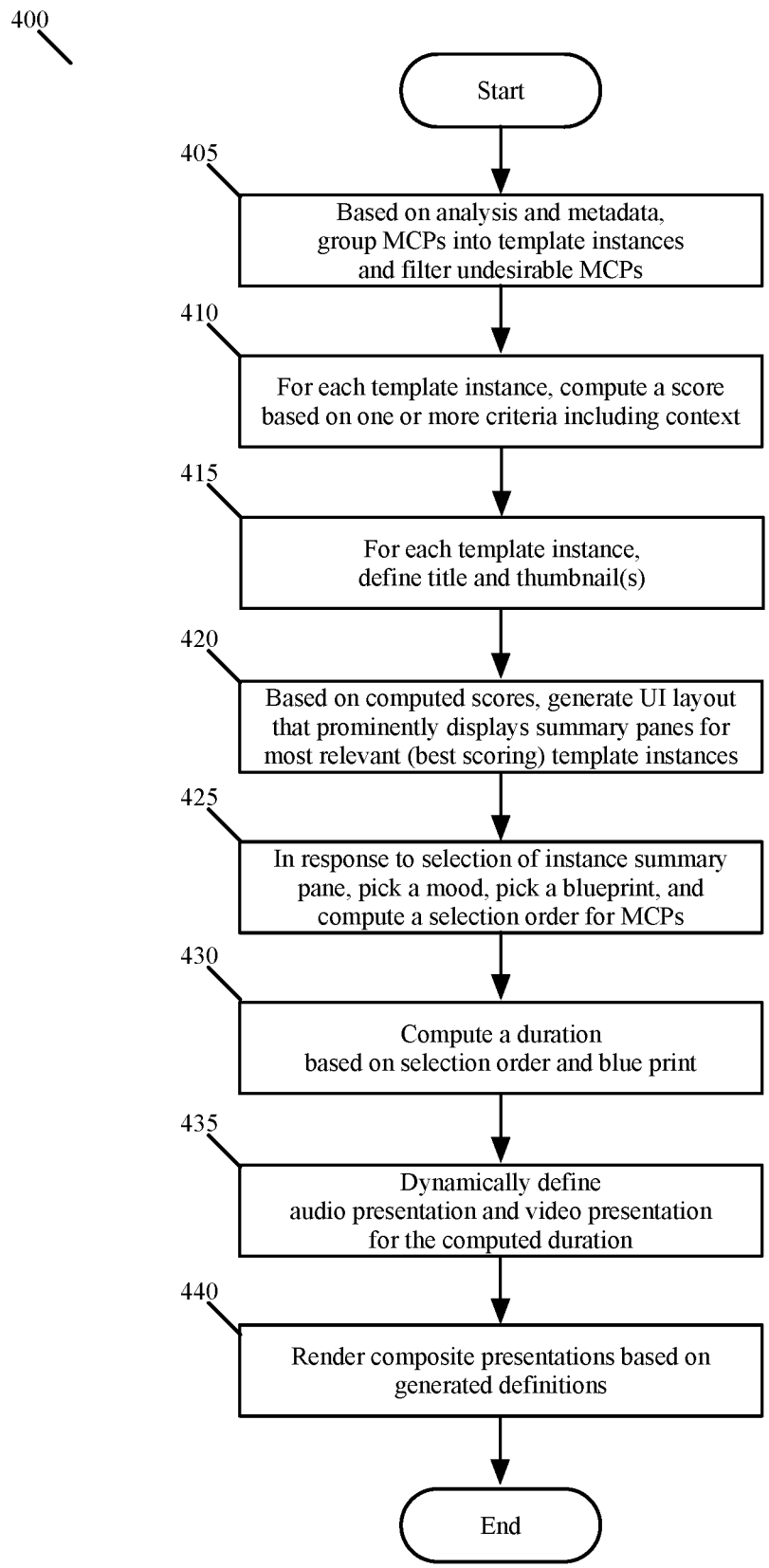
FIG. 4 illustrates a process of operations performed by the media-compositing application of FIG. 1.

The operation of the application 100 will now be described by reference to a process 400 of FIG. 4. The sequence of the operations of the process 400 just presents one manner that the modules of this application operate in some embodiments. One of ordinary skill will realize that, as described above and further below, other embodiments have these modules perform these operations in a different sequence, and/or have some of the operations performed by other modules. As such, the description of process 400 is meant to provide only one exemplary manner for implementing some embodiments of the invention.

The process 400 starts by the collection generator 105 defining and/or updating template instances that group MCPs based on their similar attributes. As mentioned above, the collection generator 105 in some embodiments uses one or more media grouping templates (templates) in the template storage 145 to associate the MCPs stored in the media content storage 140 with one or more template instances. In some embodiments, the generator 105 also tries to associate MCPs stored remotely (e.g., on remote storages of other devices) with one or more template instances.

As further described below, the collection generator 105 compares a template's attribute set with the content and/or metadata of the MCPs in order to identify MCPs that match the template attributes. After identifying the MCP collection for a template instance, the collection generator 105 discards undesirable MCPs from a template instance. Undesirable MCPs include poor quality MCPs (e.g., MCPs with too much camera motion, etc.), uninteresting MCPs (e.g., pictures of receipts, screenshot photos, etc.), and duplicative or nearly duplicative MCPs. Duplicative MCPs (e.g., multiple nearly identical or very similar photos) often do not lead to an interesting composite presentation. However, in some cases, duplicative MCPs (e.g., photos from a burst-mode sequence) are not filtered. Also, in some embodiments, some or all of the undesirable MCPs (e.g., the uninteresting MCPs, or the MCPs with poor image characteristics) are filtered out before the collection generator 105 defines the template instances.

Next, at 410, the process 400 has the scoring engine 120 generate a score for each template instance that is defined or updated at 405. In different embodiments, the scoring engine 120 generates the scores for the template instances differently. In some embodiments, a template instance's score is a weighted combination (e.g., weighted sum) of (1) a contextual score that is based on contextual attributes relating to the time at which the UI layout is being generated and/or displayed, (2) a quality score that quantifies the quality of the MCPs of the template instance, and (3) a quantity score that quantifies the quantity of the MCPs of the template instance. The computation of these scores was described above, and is further described below.

At 415, the process 400 defines a title and selects one or more thumbnails for each defined or updated template instance. Some embodiments use the title and thumbnail(s) for the template instance's summary pane in the generated UI layout. In some embodiments, the layout generator 110 derives a template instance's title from the attribute set (e.g., MCP metadata such as location, or MCP content such as smiles, etc.) of the instance. Also, in some embodiments, the layout generator derives the instance's thumbnails from one or more of the better quality MCPs of the instance. Some embodiments compute a score that quantifies the intrinsic quality of an MCP as further described below.

Next, at 420, the layout generator 110 in some embodiments generates UI layouts that identify the defined template instances as MCP groups for which the application can display composite presentations (e.g., video presentations). At any given time, the layout generator 110 of some embodiments generates a UI layout that identifies a subset of the defined template instance that would be contextually relevant to a user of the device at that time.

To arrange the template instance summary panes in the UI layout in a contextually relevant manner, the layout generator 110 in some embodiments uses the template instance scores computed at 410. For instance, in some embodiments, the layout generator 110 uses the computed template instance scores (1) to sort the template instances, (2) to show the contextually most relevant template instances in the featured, first display section 210 of the UI layout, and (3) to identify the template instances that are to be initially displayed in each template category in the second display section 215 of the UI layout.

In some embodiments, the contextually most relevant template instances for the first display section are the template instances that have the highest composite computed score (e.g., are the template instances with the highest weighted sum score computed from the composite score, quality score, and quantity score). The template instances that are then initially displayed for each template category are the template instances that are highest composite scoring template instances in their category that are not displayed in the first display section.

Other embodiments use the computed scores in a different manner to define the arrangement of the summary panes in the UI layout. For instance, in some embodiments, the contextual and quality scores are used to identify the arrangement of summary panes in the first display section 210, while the quality and quantity scores are used to identify the arrangement of the initially displayed summary panes in the second display section 215. Other embodiments use these or other scores in other manners to define the UI layout.

At 425, a user selects a summary pane for a template instance. In response, the layout generator in some embodiments directs (at 425) the media compositor 125 to generate, for the selected template instance, the definition of the composite presentation. In some embodiments, the media compositor 125 generates the definition of the composite media presentation from the MCPs of the template instance, while directing the song compositor to generate the definition of the associated composite song presentation.

To generate the definition of the media composite presentation, the media compositor 125 automatically picks (at 425) the mood for the composite presentation based on the type and/or duration of media in the template instance, content analysis on this media (e.g., detection of high motion video), and detected user-mood preferences. After picking the mood, the media compositor picks (at 425) a blueprint for the composite presentation based on the selected mood. As described above, the blueprint in some embodiments describes the desired transitions, effects, edit styles (including pace of the edits), the desired type of presentation, etc.

At 425, the media compositor defines the selection order for selecting the MCPs of the selected template instance. As described above and further described below, the media compositor defines the selection order by having the scoring engine compute extrinsic scores that quantify the time-and-difference distance values between the MCPs of the template instance.

Next, at 430, the media compositor computes a desired duration for the composite presentation based on the selection order and the blue print. For instance, the video-compositor of some embodiments selects a subset of the MCPs of the template instance up to the position in the selection order where two successive MCPs are within a certain time-and-difference distance of each other (e.g., within 0.25 unit time-and-difference distance of each other). In conjunction with the blueprint, which specifies the type of desired edits (e.g., fast transition edits, or slow transition edits), the selection of the subset of MCPs based on the selection order, allows the media compositor to automatically define the duration of the composite presentation without any user input.

For instance, some embodiments compute the duration as the sum of the ideal duration of each MCP in the subset of selected MCPs. In some embodiments, each MCP has an MCP type, and the MCP's ideal duration is the ideal duration that is defined by its type. In some of these embodiments, the ideal duration for an MCP type is adjusted based on the blueprint that is selected. Other embodiments automatically define the duration of the composite presentation differently. For instance, in some embodiments, the media compositor does not account for the blueprint in computing the desired duration, and just computes the desired duration of the composite presentation based on the subset of MCPs that it picked by using the selection order.

After computing (at 430) the desired duration of the composite presentation, the media compositor 125 in some embodiments (at 435) provides this duration to the song compositor 130 and directs this compositor to dynamically generate the definition of a song presentation that has this duration. As mentioned above, the song compositor generates this definition by exploring different combinations of body segments from one or more songs, along with different possible starting and ending segments.

Next, at 435, the media compositor dynamically generates the definition of a media presentation that has the desired duration. As mentioned above and further described in concurrently filed U.S. patent application Ser. No. 15/283, 054 entitled "Synchronizing Audio and Video Components of an Automatically Generated Audio/Video Presentation," now issued as U.S. Pat. No. 10,062,415, the media compositor 125 uses a constrained solver that generates a composite media definition by exploring different manners for combining the MCPs of a template instance based on (1) a set of constraints that limit the exploration of the solution space, and (2) metadata tags that specify content characteristics (e.g., for a photo, or for ranges of frames of a video). This concurrently filed U.S. Patent Application is incorporated herein by reference.

In exploring the solution space to find an optimal solution that satisfies the constraint and meets one or more optimization criteria, the constrained solver in some embodiments (1) identifies different portions of the template instance MCPs (e.g., different segments of the video clips, etc.) based on the metadata tag ranges, and (2) explores solutions based on these identified portions. Also, the media compositor specifies Ken-Burns effects and other special treatments for still photos and other MCPs in order to generate aesthetically pleasing media presentations.

At 435, the video and song compositor 125 and 130 have several interactions in order to synchronize the defined media and song presentations. For instance, as mentioned above, the media compositor obtains the location of the ending segment, and/or the stinger in this ending segment, from the song compositor in order to align the start of the last video or image segment with this ending segment or stinger. Also, in some embodiments, the media compositor obtains from the song compositor the location of any fade-out effect that the song compositor is defining for the end of the song presentation, so that the media compositor can synchronize its video fade-out effect with the audio fade out. In some embodiments, the media compositor can also obtain from the song compositor one or more audibly discernable transition location that are near a particular time in the presentation, so that the media compositor can roll a video edit at this time to coincide with one of obtained locations. This will be further described in the above-incorporated patent application.

After the video and song compositors generate the definitions for the media and song presentations, the rendering engine 135 generates (at 440) a rendered composite presentation from these definitions. In some embodiments, the rendering engine 135 outputs the rendered composite presentation to a frame buffer of the device for display. In other embodiments, the rendering engine can store the rendered composite presentation in a file that it stores on the device.

Before or after viewing the composite presentation, the application allows a user to modify the composite presentation. For instance, in some embodiments, the user can modify the duration or mood of the composite presentation. Some embodiments also allow the user to change the song that is used for the composite presentation. Similarly, some embodiments allow the user to change the MCPs (e.g., add or delete MCPs) that are used for the composite presentation.

Figure 5:
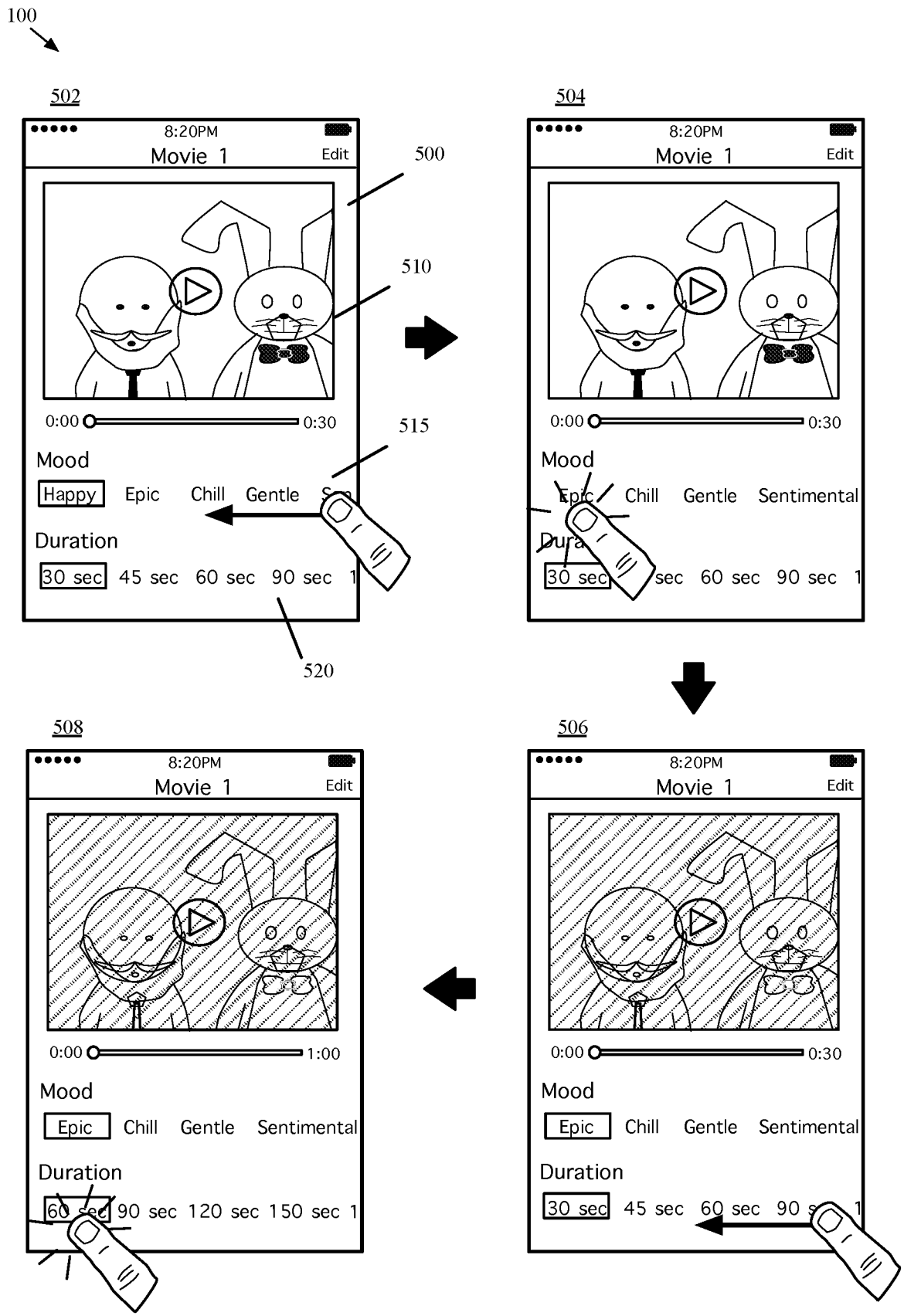
FIG. 5 illustrates an example of the media-compositing application user interface of some embodiments.

FIG. 5 illustrates how the UI of the application of some embodiment represents the machine-selected mood and the machine-generated duration of the composite presentation, and how this UI allows the user to change this presentation and duration. This example is illustrated in four operational stages 502-508 of the mobile device 100. Each of these stages shows a page 500 that displays a viewer 510 in which the composite presentation can be played. This application illustrates this page 500 after finishing a full-screen display of the composite presentation or after the user stops the full-screen composite presentation display. In some embodiments, the user has to select the viewer (e.g., by tapping it) to start a full screen display of the presentation again, or to start a display of this presentation just in the viewer's window.

Each stage also shows a mood slider 515 and a duration slider 520. Each slider lists a number of candidate slider values that can scroll left and right across the screen in a sliding direction when the user performs a drag operation on the slider. The mood slider lists several mood values (e.g., Happy, Epic, Chill, Gentle, Sentimental, etc.), while the duration slider lists several durations (e.g., 30 seconds, 45 seconds, 60 seconds, etc.).

The first stage 502 shows the user performing a drag operation on the mood slider 515. This stage also shows the machine-selected mood for the composite presentation is happy. The second stage 504 shows the user selecting the Epic mood in order to change the mood of the composite presentation from Happy to Epic. The third stage 506 shows that the presentation mood has been changed to Epic.

The third stage 506 also shows the user performing a drag operation on the duration slider 520. This stage also shows the machine-defined duration for the composite presentation is 30 seconds. The fourth stage 508 shows the user selecting a 60 second duration in order to change the duration of the composite presentation from 30 seconds to 60 seconds. The fourth stage 508 also shows that the presentation duration has been changed to 60 seconds.

Figure 6:
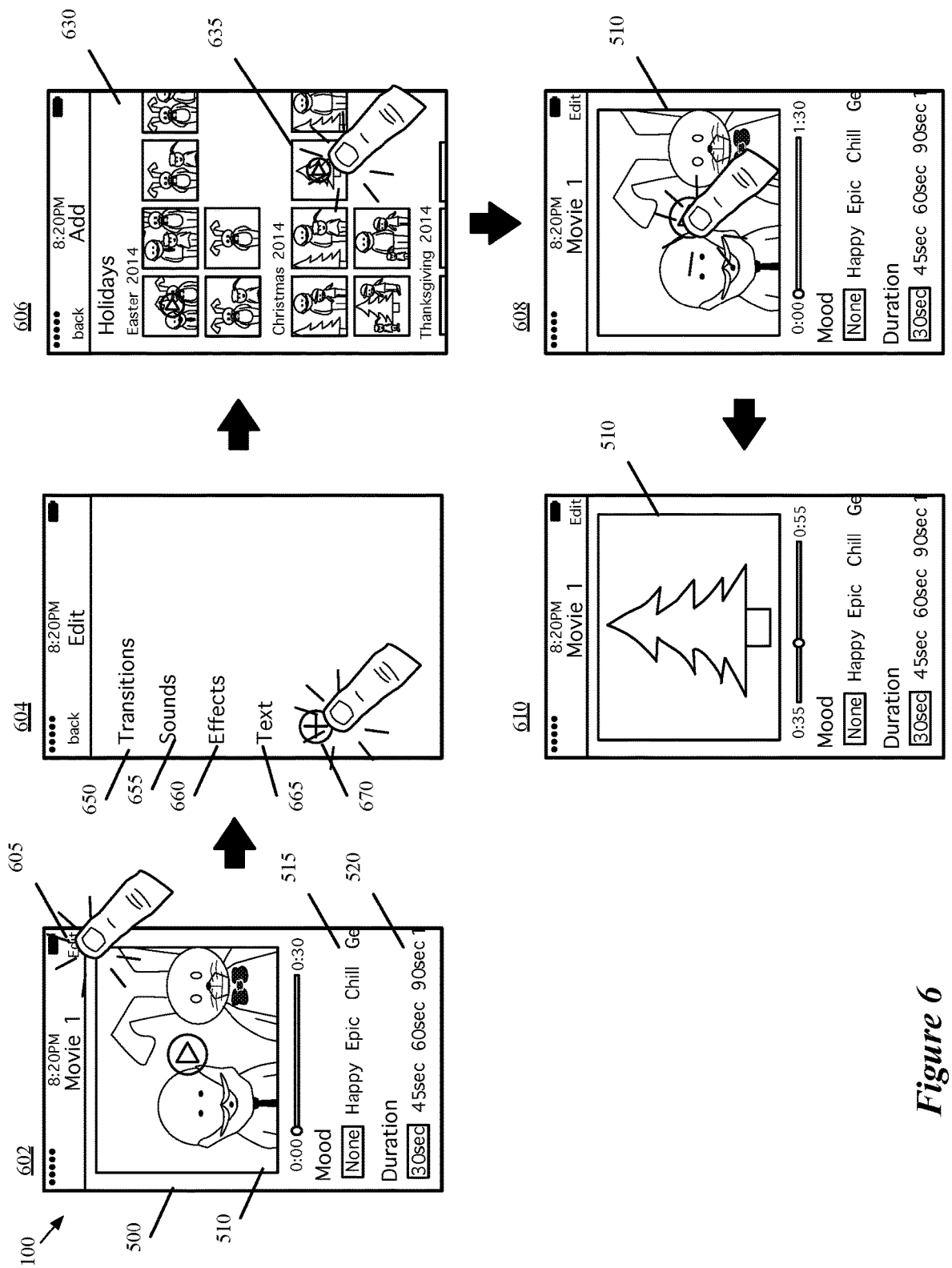
FIG. 6 illustrates an example of allowing a user to change content for the composite presentation.

FIG. 6 illustrates how the UI of the application allows the user to change the content that the application automatically picks for the composite presentation. This example is illustrated in five operational stages 602-610 of the mobile device 100. The first stage 602 is similar to the first stage 502 of FIG. 5 in that it displays page 500 with the viewer 510, the mood slider 515 and the duration slider 520. This page also includes an Edit control 605. The first stage shows the user's selection of this control.

The second stage 604 shows that in response to the selection of the Edit control 605, the application displays several edit controls, such as (1) a transition control 650 for modifying one or more machined selected transitions in the composite presentation, (2) a music control 655 for modifying the song that is used to automatically generate a song for the composite presentation, (3) an effects control 660 for modifying one or more machined specified effects for the composite presentation, (4) a title control 665 for modifying one or more machine-generated titles for the composite presentation, and (5) a content control 670 for adding or removing MCPs automatically selected for the composite presentations.

Selection of any of these controls would direct the application to present one or more additional controls for effectuating the operation associated with the selected control. In the example illustrated in FIG. 6, the selected control is the content control 670, which is selected in the second stage 604.

The third stage 606 shows that the selection of the content control 670 directs the application to present a page 630 that displays a list of MCPs that the user can select to add or remove MCPs from the composite presentation. On this page, some embodiments display the MCPs that are already included in the composite presentation differently (e.g., with a different shade or with a designation on top) than the MCPs that are not already included in the presentation.

The third stage 606 also shows the user selecting a thumbnail of a video clip 635 for addition to the composite presentation. The fourth and fifth stages 608 and 610 then show the composite presentation playing in the viewer 510. As shown in the fifth stage, the composite presentation now includes content from the selected video clip 635.

Figure 7:
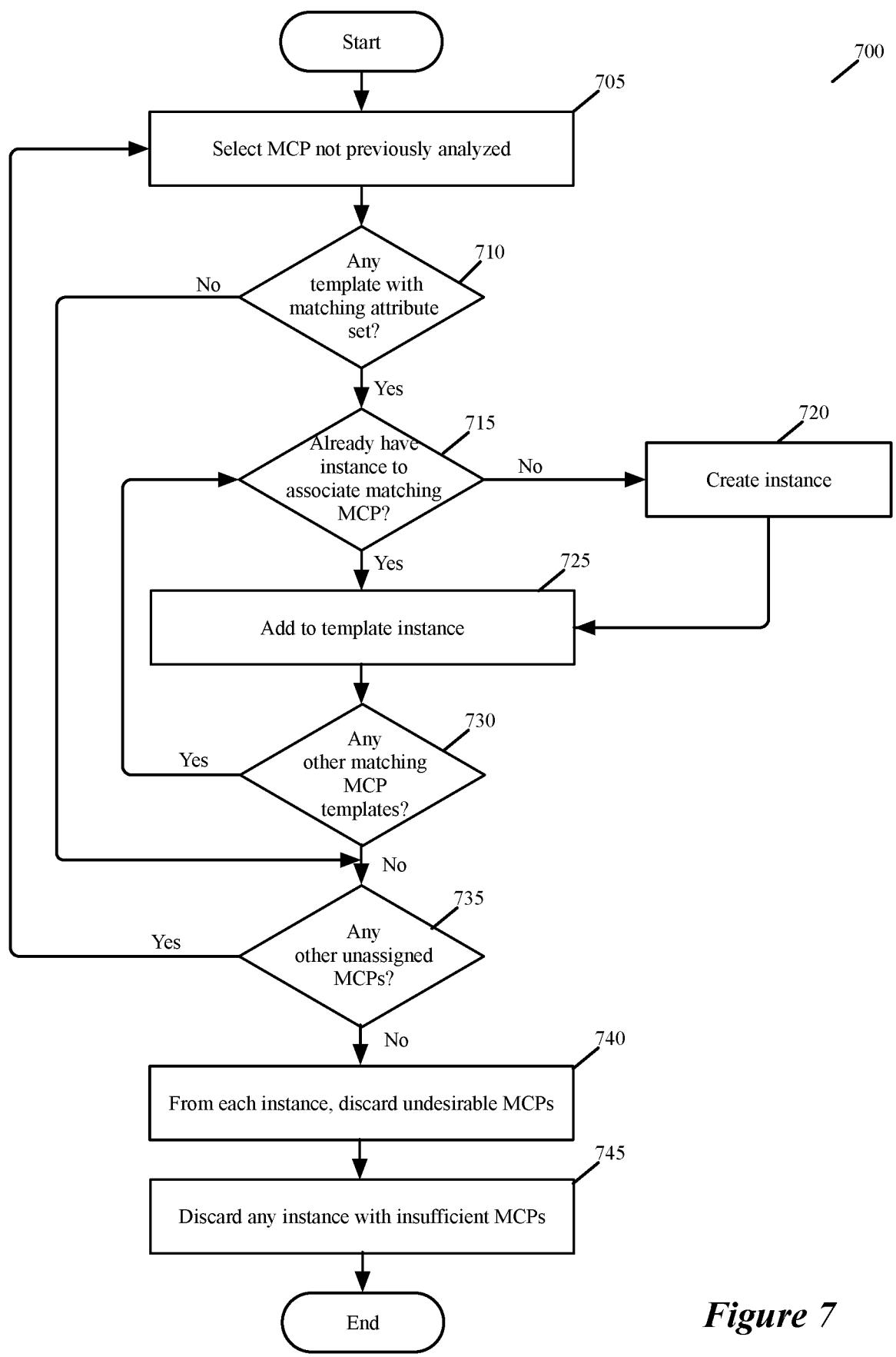
FIG. 7 illustrates a process of associating media content pieces (MCPs) to one or more template instance.
Figure 8:
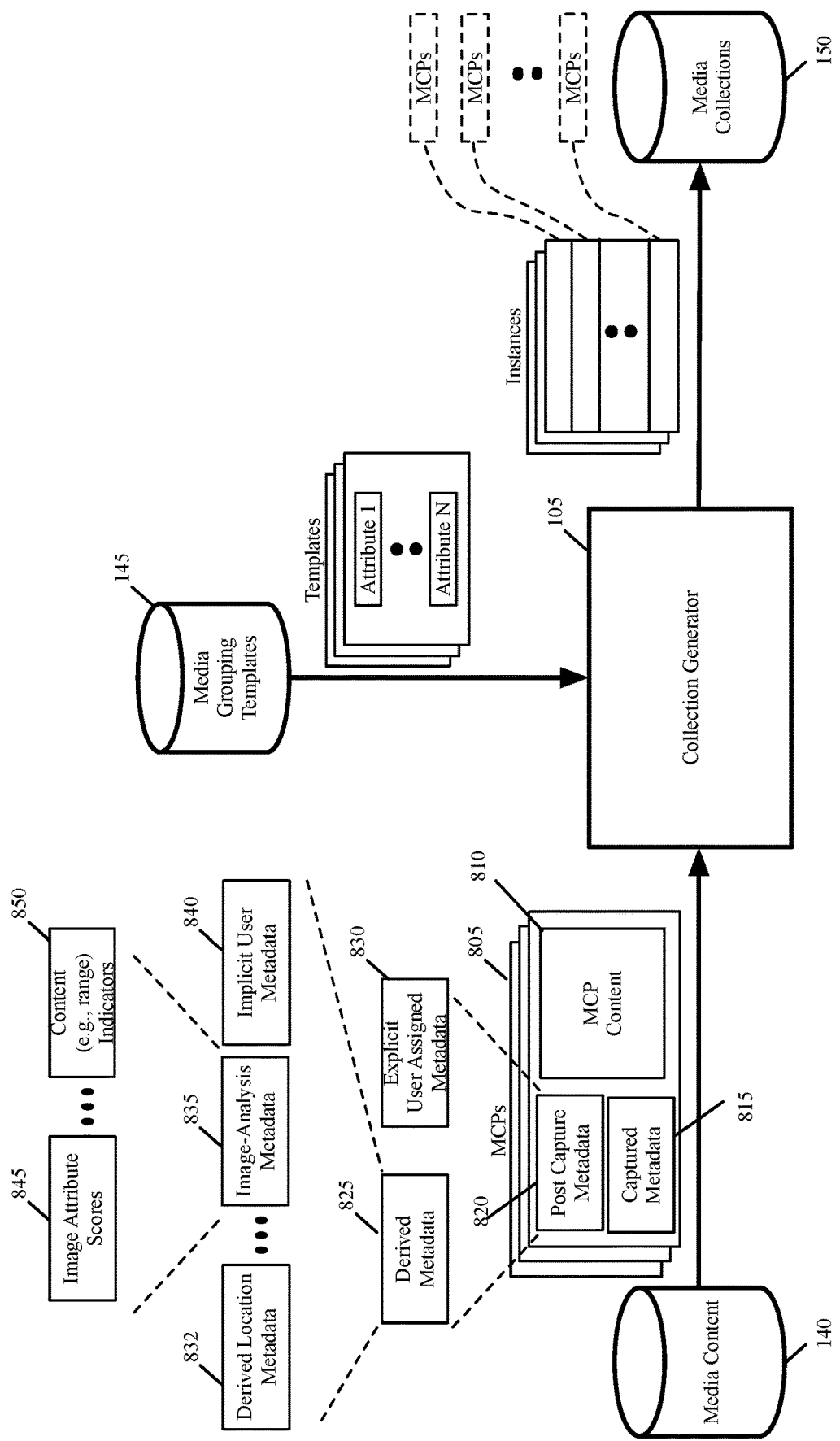
FIG. 8 illustrates associating the MCP to a template instance by adding a reference to the template instance.

FIG. 7 illustrates a process 700 that the collection generator 110 to try to associate MCPs to one or more template instance. This figure will be described by reference to FIG. 8, which illustrates the inputs that the collection generator processes to automatically define the template instances without user input. As shown in FIG. 8, the collection generator 105 receives MCPs along with their associated metadata from the media content storage 140. The collection generator 105 compares each MCP's metadata with the attribute set of each template stored in the template storage 145, in order to determine whether the MCP should be associated with the template. When the MCP match should be associated with a template, the collection generator associates the MCP to a template instance of the matching of template. In the example illustrated in FIG. 8, this association is established by adding a reference (e.g., a pointer or an identifier) to the template instance that refers to the matching MCP. When one such template instance has not been previously defined, the collection generator defines the template instance.

In some embodiments, the process 700 starts each time the application starts. Also, in some embodiments, the process starts each time the application is running and one or more new MCPs are received. For instance, in some embodiments, the application executes on a mobile device that has a camera that captures pictures and videos. In some of these embodiments, the process 700 starts each time the device captures one or more new photos or videos. These or other embodiments can also start the process whenever a new set of MCPs become available on a remote storage.

In some embodiments, the process 700 can also start each time a new template is added to the template storage 145. In such a case, the process 800 analyzes again all previously analyzed MCPs for this new template. Other embodiments start the process 800 different, e.g., perform this process periodically, e.g., every hour, six hours, twelve hours, twenty four hours, etc. Conjunctively, or alternatively, some embodiments start this process whenever the application opens and/or based on user request.

As shown, the process 700 initially selects (at 705) an MCP that it has not previously analyzed to associate with one or more templates. In some embodiments, the selected MCP might be a new MCP, or it might be a previously analyzed MCP that has not been analyzed for one or more new templates that have been recently defined. The selected MCP in some embodiments is one that resides on a data storage (e.g., a database) that resides on the device that executes the collection generator. In some embodiments, the selected MCP can be an MCP that resides on a separate device (e.g., another computer, server, mobile device, etc.) that is accessible by the collection generator's device through a network.

As shown in FIG. 8, an MCP 805 in some embodiments includes MCP content 810, captured metadata 815, and post-capture metadata 820. The MCP content typically includes image content, such as pixel values for one or more photos or video frames. It can also include one or more audio tracks, as in the case where the MCP is a video clip with an audio track. Examples of different types of visual MCP content include a still photo, a video clip, a burst-mode photo sequence, a panoramic photo, a time lapse videos, a slow motion video, etc.

The captured metadata 815 includes metadata generated by the MCP capture device, e.g., the camera, at the time that the MCP is captured. Examples of capture metadata include date and time of MCP capture, location of MCP capture, and one or more camera settings (e.g., exposure, focus rectangle, etc.) for the MCP capture.

Post-capture metadata include metadata that is defined for the MCP after the MCP has been captured. As shown, two examples of post-capture metadata include derived metadata 825 and explicit user-assigned metadata 830. User-assigned metadata 830 includes keywords (e.g., birthday, vacation, anniversary, etc.) or other tags (e.g., like, dislike, favorite, etc.) that the user assigns to MCP. It also includes user-specified associations for the MCP, e.g., inclusion in a user-specified album, etc.

The derived metadata 825 includes different types of metadata that are derived by analyzing the MCP content 810, the captured metadata 815, user-assigned metadata 820 and/or user actions with respect to the MCP. One or more framework services of the device analyze the MCPs, their metadata and associated user actions to produce the derived metadata 825. Examples of such derived metadata include derived location metadata 830, image-analysis metadata 835, and implicit user metadata 840. Implicit user metadata 840 is metadata that is generated by monitoring user actions with respect to the MCP, e.g., sharing the MCP with others, repeatedly viewing the MCP, etc.

Derived location metadata 830 include location data that is associated with the MCP by analyzing the metadata associated with the MCP. For instance, in some embodiments, the captured location metadata for an MCP is analyzed in order to associate the MCP with region and/or area designations that allow the MCP to be grouped with other MCPs. In some embodiments, the application or a framework service generates a hierarchical directed acyclic graph (DAG) structure that includes nodes corresponding to regions and sub-regions. In some of these embodiments, the derived location metadata is defined in terms of region node identifiers in DAG structure.

Image analysis metadata 835 includes one or more metadata attributes that are defined by analyzing the MCP image content 810. In some embodiments, this metadata includes image attribute scores 845 and content indicators 850. Examples of image attribute scores 845 include scores for quantifying focus, exposure, blur, sharpness, color attributes, etc. These scores are generated one or more framework services of the device in some embodiments. The content indicators 850 indicate the type of MCP content and characterize this content. In case of an MCP clip with multiple frames or images (e.g., in case of a video clip), the content indicators can be expressed in terms of ranges that define the range of images or frames over which a particular content indicator is valid. Examples of content indicators include face indicators, smile indicators, voice indicators, camera motion indicators, junk content indicators, scene indicators, image quality indicators, etc. These indicators are generated one or more framework services of the device in some embodiments.

After selecting an unassigned MCP, the process 700 determines (at 710) determines whether any template in the template storage 145 has a set of attributes that match the captured or post-captured metadata 810 and 815 of the MCP. As described above, a template in some embodiments is defined by reference to a set of media matching attributes 855. The process 700 compares (at 710) a template's attribute set with the MCP's metadata in order to identify MCPs that match the template attributes.

Examples of templates in some embodiments include (1) location-bounded templates (e.g., videos and/or photos captured within a region with a particular radius), (2) time-bounded templates (e.g., videos and/or photos captured within a particular time range and/or date range), (3) time-bounded and location-bounded templates (e.g., mornings at a beach), (4) content-defined templates (e.g., videos and/or photos containing smiles), (5) user-metadata based templates (e.g., MCPs from albums created by the user, MCPs shared by a user with others, MCPs having particular user-defined metadata tags, etc.), and (6) any combination of these templates.

Each of these types of templates can be expressed in terms of a set of template attributes. For example, a location-bounded, content-defined templates might specify two attributes: (1) the MCP should contain a smile, and (2) the MCP is captured within a machine-derived region that is not the device's home or work location. For this template, a template instance is then defined to include any MCP that has metadata that indicates that its image content includes a smile and that its derived location metadata 830 indicates that it is associated with a machine-specified region that is not the device's home or device.

When the selected MCP matches a template's attribute set, the process determines (at 715) whether it has previously defined a template instance to which the selected MCP should be matched. This is because the process can define multiple template instances for a template, and it can associate different MCP sets with different template instances of the template. Different MCP sets can be grouped into different template instances of a template when at least one particular attribute of the template can have multiple possible values. In this case, different MCP sets have different acceptable matching attribute values for the particular template attribute.

For example, a time and location-bounded template might be defined in terms of (1) a time range tuple specifying 12 pm to 4 pm, (2) a day range tuple specifying Sunday, and (3) a location tuple specifying any region that is not associated with the device's home or work location. For this template, the application might identify multiple template instances that include different sets of MCPs that are captured at different locations on Sunday afternoons, with each template instance associated with a different region that the device identifies by analyzing the captured MCP data or through other analysis.

When the process determines (at 715) that it has not previously defined a template instance to which the selected MCP should be associated, it defines the template instance at 720, and then transition to 725. The process also transitions to 725 when it determines (at 715) that it has previously defined a template instance to which the selected template should be associated.

At 725, the process associates the selected MCP with the template instance. As shown in FIG. 8, this association is established in some embodiments by adding a reference (e.g., a pointer or an identifier) to the template instance that refers to the matching MCP. The process 700 stores the defined template instances in the media collection storage 150, as shown in FIG. 8.

At 730, the process determines whether the selected MCP matches the attribute set of any other template. If so, the process returns to 715 to associate the selected MCP with a template instance of this other template. Otherwise, the process determines (at 735) whether it has processed all the MCPs that it needs to examine. If not, it returns to 705 to select another MCP that it has not previously analyzed to associate with one or more templates.

When the process 700 determines (at 735) that it has processed all the MCPs that it needs to analyze, the process analyzes (at 740) each template instance that it modified (at 725) in order to filter out undesirable MCPs. In some embodiments, the undesirable MCPs that are filtered out (at 740) include MCPs that unnecessarily duplicative of other MCPs in the same template instance. Some embodiments filter out other MCPs, such as poor quality MCPs (e.g., MCPs with too much camera motion, etc.) and uninteresting MCPs (e.g., pictures of receipts, screenshot photos, etc.). However, in some embodiments, such other undesirable MCPs are filtered out at other stages of the MCP processing, such as before the collection generator 105 defines the template instances and while the media compositor defines the composite media presentation.

After 740, the process determines (at 745) whether it should filter out any of the template instances that it has created. In some embodiments, the process 700 eliminates a template instance when the instance does not have a sufficient number of high quality MCPs, because such a template instance would not be suitable for producing interesting composite presentations. In some embodiments, eliminating a template instance simply entails designating (e.g., with a flag) the template instance as one that the layout generator should not consider for presenting in the UI layout. In these embodiments, the collection generator does not discard an eliminated template instance, because it will use this instance in subsequent iterations of the process 700 in order to possibly associate newly analyzed MCPs with this instance. When enough high quality MCPs are subsequently added to the template instance, the template instance is no longer filtered out (e.g., process 700 in a subsequent iteration changed the instance's designation so that it can be considered by the layout generator). After 745, the process 700 ends.

In some embodiments, the collection generator defines time and/or location based template instances by first clustering the MCPs into time and/or location based clusters, and then it analyzes these clusters to identify clusters that match templates and to define template instances for these matching clusters. This approach is used because for some templates, a template instance cannot be defined for just one matching MCP that is associated with a template at 710. In order to create instances for these templates, the MCPs first need to be clustered based on their location and/or time attributes.

Figure 9:
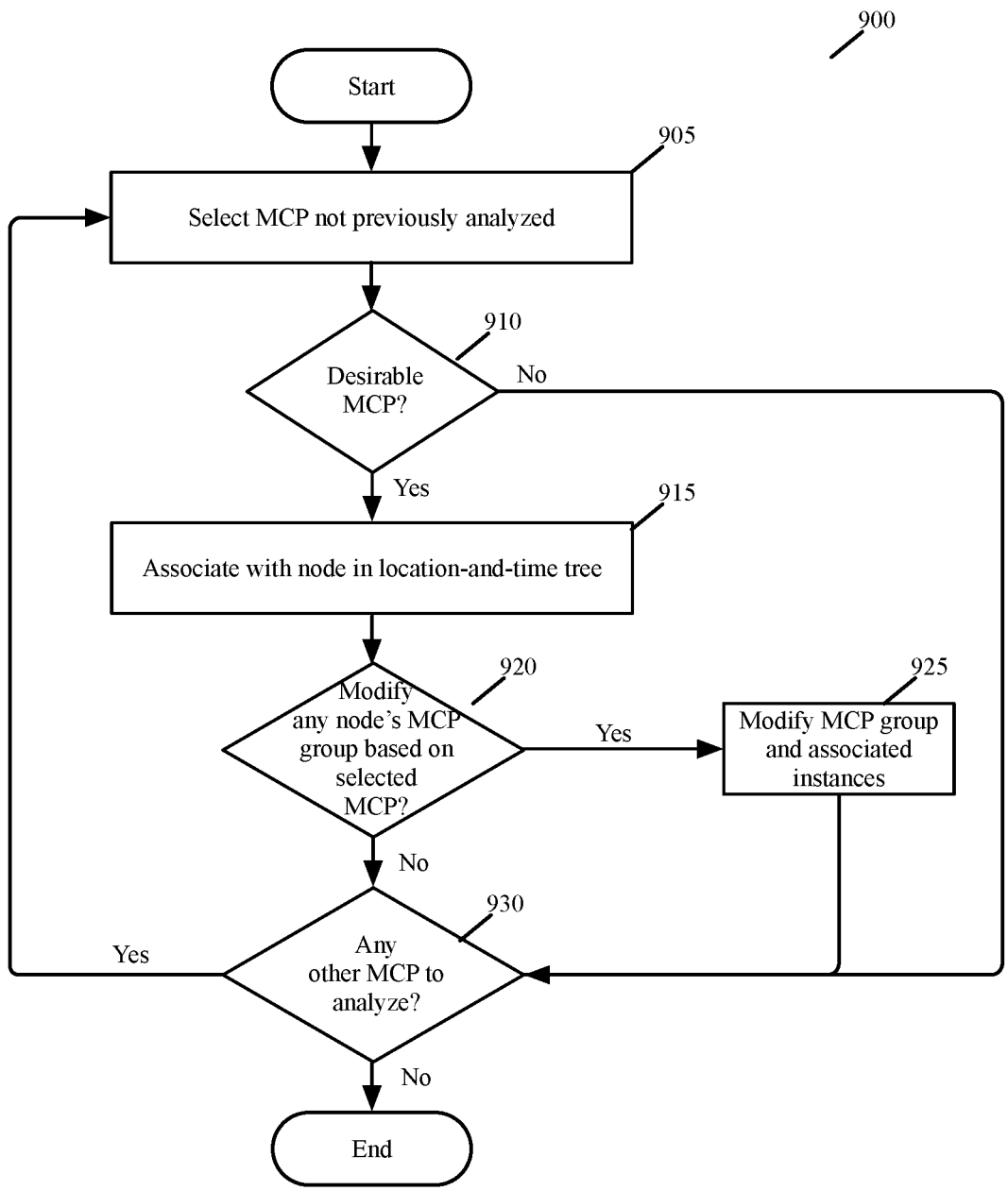
FIG. 9 illustrates a process that associates MCPs in a location-and-time tree into several clusters.

Such a clustering approach will now be described by reference to FIGS. 9-11. FIG. 9 illustrates a process 900 that associates MCPs in a location-and-time tree that organizes the MCPs into several clusters based on their location and time attributes. This process will be described by reference to FIG. 10, which illustrates an example of a location-and-time tree 1000. This tree has multiple nodes arranged in multiple levels that correspond to multiple geographic hierarchical levels. Each non-root and non-leaf node can have one parent node and one or more child nodes. The root node can have only child nodes. In this example, the child nodes of the root node are countries, but can be other child nodes, such as continents. Leaf nodes have a parent node, but no child nodes. As further described below, each node can be associated with one or more MCP clusters, and each MCP cluster 1010 can be associated with a range of time.

Figure 10:
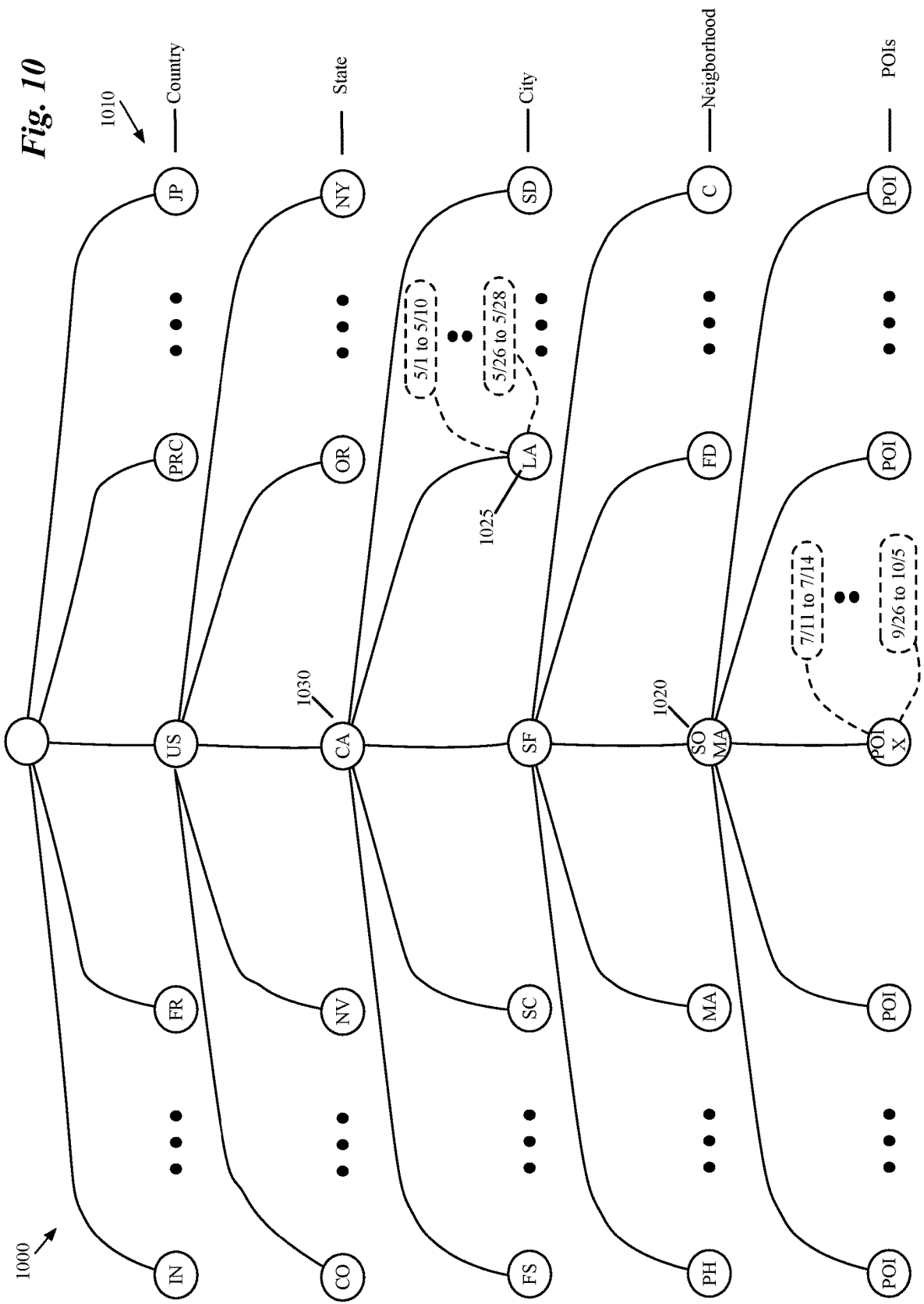
FIG. 10 illustrates an example of a location-and-time tree of some embodiments.

In the example illustrated in FIG. 10, the second level from the top defines countries, the third level defines states or regions within the country, the fourth level defines cities within the regions/states, the fifth level defines neighborhoods within the cities, and the sixth level defines points of interests (POIs) or regions of interests (ROIs) in the cities. In some embodiments, two or more of the POIs/ROIs might be associated with the home or work addresses of the user of the device that executes the compositing application. In some embodiments, the device and/or compositing application can identify the user's home and/or work addresses from the device's travel to these locations during certain hours, from a contact card associated with the user, and/or from the metadata of the MCPs captured by the user.

This example illustrates only the child state nodes for US, the city nodes for the California node, the neighborhood nodes for the San Francisco node, and the POI nodes for the South of Market (SOMA) child node. Other nodes have other child nodes, but displaying these nodes would not be possible on one sheet and would unnecessarily convolute the illustration of FIG. 10.

The process 900 of FIG. 9 places MCPs into MCP clusters that are associated with nodes in the location-and-time tree 1000. As shown, the process 900 initially selects (at 905) an MCP that it has not previously analyzed to associate with location-and-time tree 1000. The selected MCP in some embodiments is one that resides on a data storage (e.g., a database) that resides on the device that executes the collection generator. In some embodiments, the selected MCP can be an MCP that resides on a separate device (e.g., another computer, server, mobile device, etc.) that is accessible by the collection generator's device through a network.

Next, at 910, the process determines whether the selected MCP is a desirable. In some embodiments, the process 900 discards (at 910) images or videos of uninteresting content (e.g., a receipts, screenshots, etc.), and of poor quality content (e.g., blurry photos and videos). When the process determines that the MCP is not desirable, it transitions to 930, which will be described below.

On the other hand, when the process determines (at 910) that the MCP should not be rejected, the process associates the MCP with a node in the location-and-time tree. The process 900 associates the selected MCP with a node that relates to a location at which the MCP was captured. The closer this location is to the home of the user for which the composite presentation is generated, the lower in the tree is the node to which the MCP is associated.

For example, if the MCP is a photo captured at Candlestick Park, the MCP is associated with a leaf POI node that is a child of the SOMA node 1020 in the example illustrated in FIG. 10. On the other hand, if the MCP is a photo captured in Santa Monica, Calif., the photo is associated with the LA node 1025 that is a child node of the California node 1030. Different embodiments might associate the MCPs differently with different level nodes. For instance, some embodiments might not associate the MCPs with the city nodes unless the city is more than a 2000 miles from the user's home location. The rationale for associating MCPs with interior nodes instead of leaf nodes is that the farther the user is from his or her home or work address, the less the user is familiar with the POIs or ROIs associated with the leaf nodes. For example, a resident of San Francisco might be very familiar with all neighborhoods in San Francisco, but he or she might not be that familiar with neighborhoods in Thailand. Hence, all photos captured in Thailand should be associated with Thailand or a city in Thailand, while photos captures in San Francisco should be associated with the neighborhoods in San Francisco.

To associate an MCP with a node, the MCP's associated location metadata is compared with the location of the nodes in the tree 1000. In some embodiments, the MCPs are tagged by a framework service of the device with a hierarchical set of attributes that correspond to the hierarchical levels of the tree 1000. For example, in these embodiments, the MCPs are tagged with country, state, city, neighborhood, and POI tags.

Based on the distance of the MCP's POI tag from the user's home, the MCP is then associated with a leaf or interior node of the tree.

To associate MCPs with nodes, the process 900 creates MCP clusters 1010 in some embodiments. These clusters in some embodiments are container data structures that refer to the MCPs that they contain. In some embodiments, each cluster is associated with a range of time that bounds the captured-time metadata of all the MCPs of the cluster. In some embodiments, the process 900 specifies a cluster list that arranges the clusters sequentially based on their respective ranges of time. This list makes it easier for process to search for clusters, and to determine whether a newly analyzed MCP should cause a previously cluster to be broken into two clusters. In some embodiments, the nodes of the location-and-time tree have one or more references (e.g., pointers) to one or more clusters in the cluster list.

When the collection generator 105 identifies an MCP for a first node that falls within the time range that was previously associated with an MCP cluster of a second node, the collection generator breaks the MCP cluster into two clusters, as further described below. In this manner, each MCP cluster is meant to represent one set of MCPs that were contiguously captured at one location over a duration of time. These MCP clusters will be subsequently analyzed to identify places, areas, trips, vacation, etc. for which template instances should be generated, as further described below by reference to FIG. 11.

Thus, at 915, the process not only identifies the node to which it should associate the selected MCP, but also associates this MCP with a previously defined MCP cluster that was previously associated with this node, or creates an MCP cluster which it can associate with this node and to which it can associate the selected MCP. In some embodiments, the criteria for adding the selected MCP to a new MCP cluster, or to a previously created MCP cluster, is whether the MCP falls within the time range of a previously created MCP cluster for the identified node, where this time range is not interrupted by the time range of any other MCP cluster.

At 920, the process determines whether it should modify any MCP clusters that it previously defined and associated with any node in the tree. The process would have to modify another MCP cluster when the selected MCP's time-capture metadata falls within the time range of the other MCP cluster. When this happens, the process 900 modifies (at 925) the MCP cluster that is affected by breaking that MCP cluster into two clusters, which respectively end before the selected MCP's capture time, and start after the selected MCP's capture time. At 925, the process also flags as invalid any template instance that was previously defined by reference to the modified MCP cluster, or marks such an instance to be analyzed again so that it could be redefined. When the template instance is marked for re-analysis, another process periodically or on-demand will analyze the template instances in batch or individually to redefine them based on the MCP cluster modification.

From 925, the process transitions to 930. The process also transitions to 930, when it determines (at 920) that it should not modify any previously defined MCP clusters based on the insertion of the selected MCP into the location-and-time tree 1000. At 930, the process determines whether any other MCP remains to be analyzed. If so, it returns to 905 to select this MCP and repeat its operations for this MCP. Otherwise, the process ends.

Figure 11:
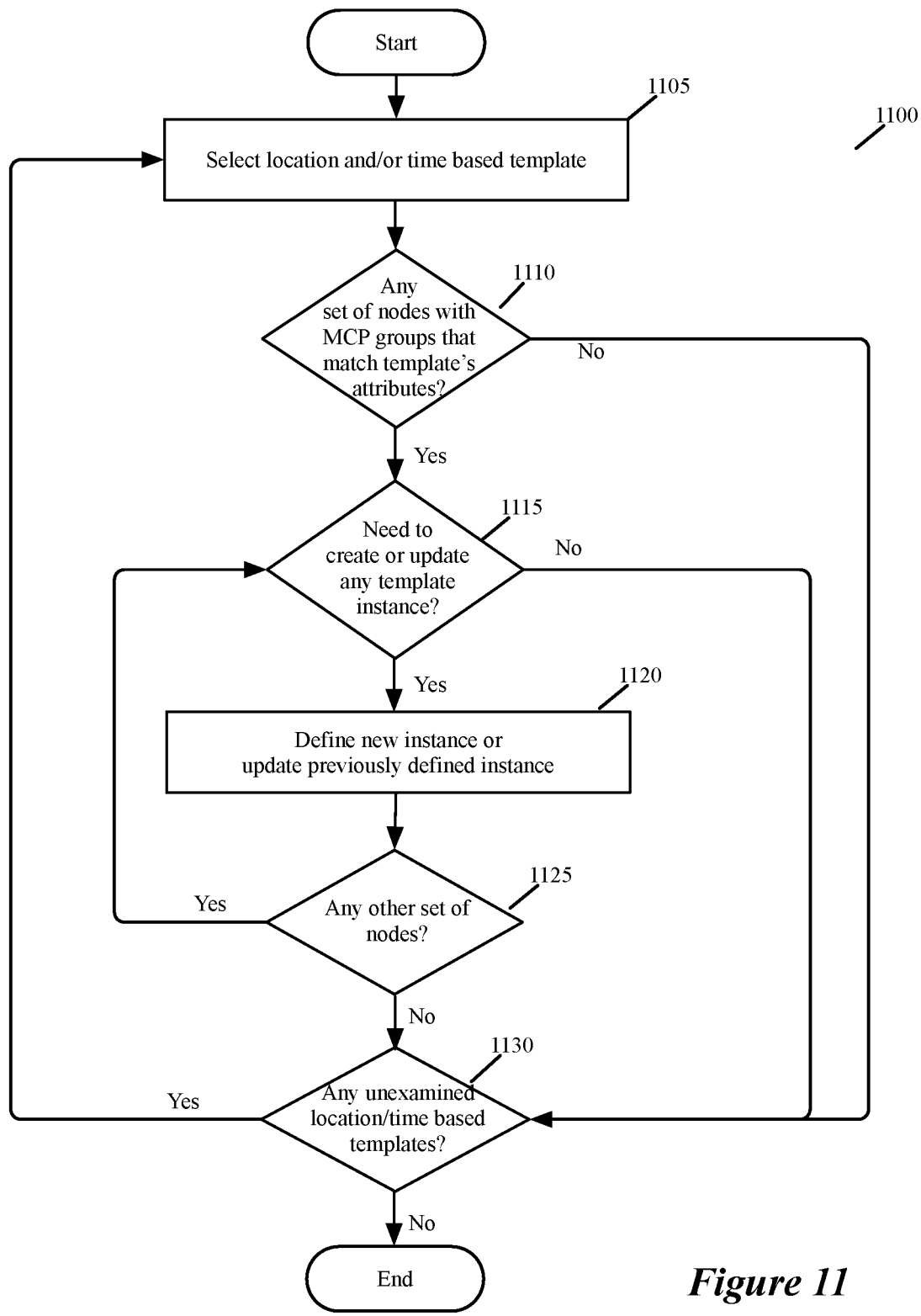
FIG. 11 illustrates a process for periodically generating template instances from MCP clusters associated with nodes of a location-and-time tree.

FIG. 11 illustrates a process 1100 that the collection generator 105 performs periodically to generate template instances from the MCP clusters associated with the nodes of the location-and-time tree. This process initially selects (at 1105) a location and/or time based template. Examples of such templates include Places, Areas, Trips, Vacations, This_Day_In_History (TDIH), Holidays, Home, Work, etc. A template instance can be defined for a template based on the MCP cluster(s) associated with a set of one or more nodes. Also, multiple such template instances can be defined for any one of these templates in some embodiments.

For example, in some embodiments, a place-template instance can be defined by the MCP cluster of one node (e.g., a POI leaf node). In other embodiments, a place-template instance can be defined by the MCP clusters that are associated with a set of nodes are parent-child nodes, or are sibling nodes. Other embodiments call such template instances that aggregate MCPs of multiple nodes as area-template instances. Still other embodiments define an area-template instance as an aggregation of the MCP clusters of two nodes that do not have a parent and child, or a sibling, relationship, but rather have a geographical proximity to each other. For instances, two MCP clusters can be associated with two nodes, one representing Lake Tahoe, Nev. and one representing Lake Tahoe, Calif. These two nodes would be grandchild nodes of Nevada and California parent nodes, and hence are neither sibling nodes nor parent-child nodes. However, the location data associated with these two nodes indicates that they are geographically near each other. Hence, the process 1100 could aggregate their corresponding MCPs to create an area-MCP instance for Lake Tahoe.

In some embodiments, every MCP cluster can be viewed as a candidate trip instances. MCP clusters to work or home locations, however, are not viewed as trip instances in some embodiments, while being viewed as trip instances to frequently traveled locations in other embodiments. Some embodiments define a vacation instance for every set of two or more trip instances (1) that have their associated MCP clusters as temporally consecutive clusters in the location-and-time tree, and (2) that are not to a frequently traveled location (such as a home or work location). In some embodiments, each vacation instance is a series of trip instances that are bounded by two MCP clusters that were captured at a frequently traveled location (e.g., home or work location).

A TDIH instance includes all MCP clusters in the location-and-time tree that were captured on a particular day in any number of years. Such instances can be created for any day, e.g., the user's birthday or anniversary when there are always a lot of high quality MCPs captured or a lot of events. Holiday instances include all MCP clusters captured on particular day (e.g., Christmas, Thanksgiving, etc.), or in a particular range of days in some embodiments.

After selecting (at 1105) a template, the process 1100 determines (at 1110) whether one or more nodes in the location-and-time tree 1000 have one or more MCP clusters that match the selected template's attributes. For instance, in some embodiments, a place template specifies creating a place instance for one or more MCP clusters that are associated with one node and that include MCPs captured on three different days. An area template specifies in some embodiments creating an area instance for two or more MCP clusters that each qualifies as a place instance and that each is associated with a different node that has a location close to the location(s) of the other MCP cluster node(s).

In some embodiments, a vacation template specifies the creation of a vacation instance that contains several MCP clusters that are associated with several trip instances that are not too frequently traveled locations and that are temporally consecutive to each other. A holiday template specifies the creation of a holiday instance for all MCP clusters in the tree that are associated with the date of the holiday in any given number of years.

When the process 1100 determines (at 1110) that no set of nodes in the tree having matching MCP cluster(s), the process transitions to 1130, which will be described below. Otherwise, the process determines (at 1115) whether it needs to create a template instance or to update a previously created template instance based on new or modified MCP clusters. The process would not need to create or update a template instance when the MCP cluster or clusters that were previously used to define the template instance have not change.

When the process determines (at 1115) that it does not need to create or update a template instance, the process transitions to 1130. Otherwise, at 1120, the process creates a new template instance or updates a previously created template instance. The process then determines (at 1125) whether any other set of nodes in the location-and-time tree 1000 have one or more MCP clusters that match the selected template's attributes. If so, the process returns to 1115 to determine whether it needs to create a template instance or update a previously created template instance for this node.

When the process determines (at 1115) that no other set of nodes in the location-and-time tree 1000 have one or more MCP clusters that match the selected template's attributes, the process determines (at 1130) whether it has examined all location and/or time based templates. If so, the process ends. Otherwise, the process returns to 1105 to select another location and/or time based template, and to repeat its operation for this template.

Figure 12:
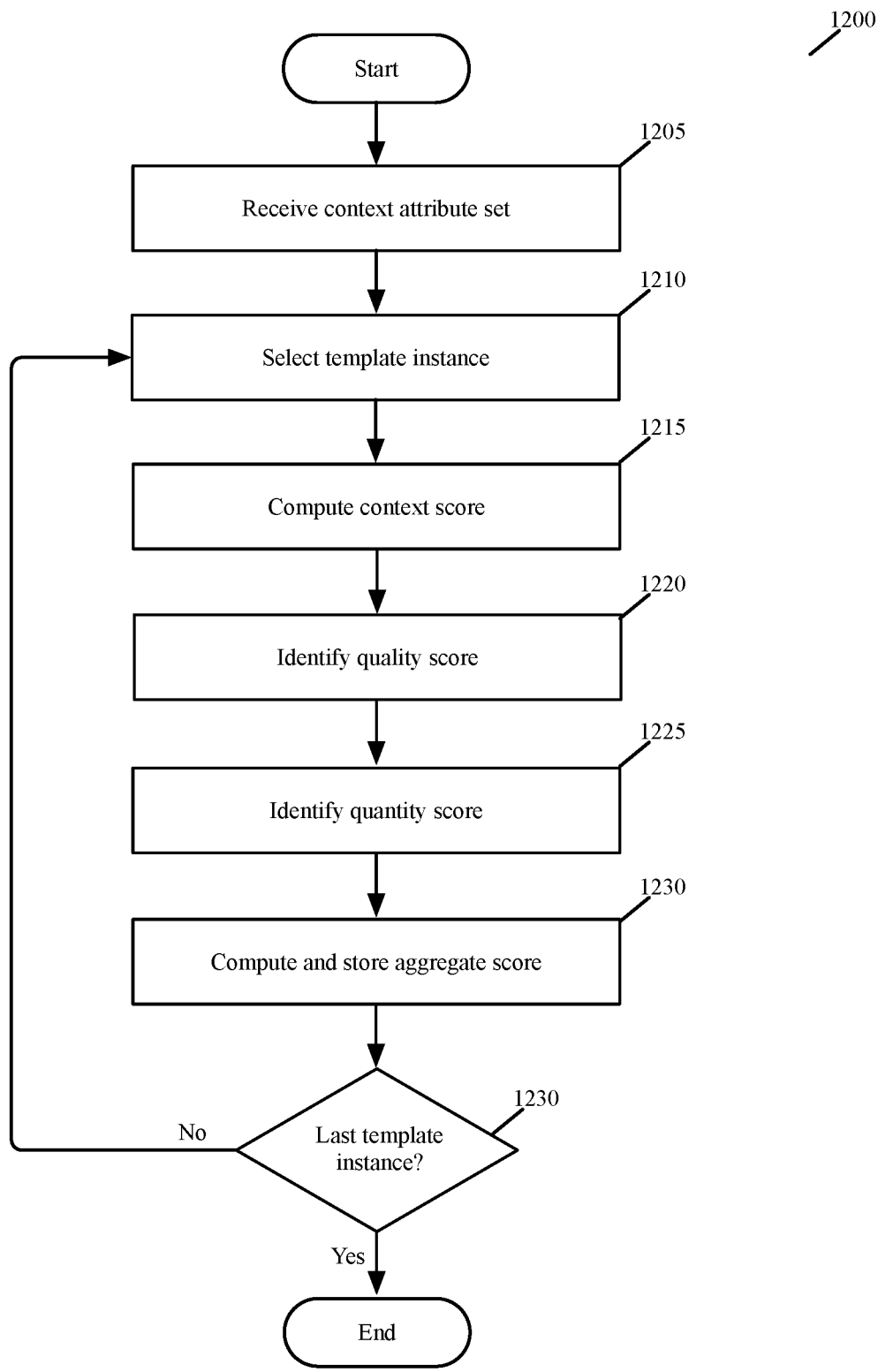
FIG. 12 illustrates a process for computing a score for a template instance.

FIG. 12 illustrates a process 1200 that the scoring engine 120 performs in some embodiments to compute a score for a template instance. In some embodiments, the scoring engine performs this process for the template instances that are stored in the collection storage 150 and that have been designated as a viable template instance for display. As shown, the process 1200 starts when the scoring engine receives (at 1205) from the layout generator a set of contextual attributes. As mentioned above, the layout generator 110 in some embodiments gets the contextual attribute set from the context identifier 115. In some embodiments, the contextual attribute set includes at least one location (e.g., expressed in terms of latitude and longitude coordinates) or one time value, which includes a date value.

The process 1200 uses the received contextual attribute set to compute a contextual score for each template instance that quantifies the contextual relevance of the template instance. In some embodiments, the contextual attribute set can include multiple contextual attribute subsets, with different subsets specifying different locations and/or time values. In some embodiments, each contextual attribute subset includes at least one location (e.g., expressed in terms of latitude and longitude coordinates) or one time value. The different contextual attribute subsets define different contexts for assessing the relevance of each template instance. Different contextual attributes can be used in different embodiments. Examples of contextual attributes include (1) current time, (2) future time, (3) current location of the device, (4) future predicted location of device (e.g., based on calendared or ticketed events stored on, or accessible by, the device) at future dates, etc.

At 1210, the process 1200 selects a template instance in the collection storage 150 that has been designated as a viable template instance for display. The process then uses (at 1215) uses the received contextual attribute set to compute a contextual score for the selected template instance that quantifies the contextual relevance of the template instance. In some embodiments, the process computes (at 1215) for the selected template instance a contextual score for each provided context attribute subset (with each subset specifying a time value and/or a location value), and then uses the highest computed contextual score for the template instance to express the contextual relevance of the template instance. To compute a contextual score for a template instance for one contextual attribute subset, the process 1200 in some embodiments computes a difference between each attribute value of the subset and the corresponding value of the template instance, and then uses the computed difference value(s) in a function to generate the context score. In some embodiments, the function is defined such that the contextual score that it computes is inversely proportional to the difference value (i.e., the smaller the difference value, the larger the value of the computed score).

After computing the contextual score for the template instance, the process identifies (at 1220) a quality score for the template instance, and identifies (at 1225) a quantity score for the template instance. Each time the template instance is updated, the scoring engine in some embodiments computes the quality and quantity scores, and stores these scores, as these scores depend on the intrinsic attributes of the template instance and do not need to be computed repeatedly in real time each time the context changes. In these embodiments, the process 1200 retrieves (at 1220 and 1225) the pre-computed quality and quantity scores for the template instance.

In some embodiments, the scoring engine 120 generates a score for a template instance that accounts for quantity of MCPs in the instance based on an assumption that a larger quantity signifies a higher level of interest in the template instance. For example, a template instance that has a lot of MCPs (e.g., photographs, video clips, etc.) captured in one location on one particular day would typically signify that at an interesting event took place at that location on that particular day and the user would hence be more interested in seeing the photos form that event. In some embodiments, each template instance's quality score accounts for the quality of the instance's MCPs based on an assumption that template instances with better content will result in better-generated composite presentations and thereby in composite presentations that are more interesting to the viewer.

After identifying the contextual score, the quality score and quantity score, the process 1200 computes (at 1230) an aggregate score. In some embodiments, this aggregate score is a weighted combination of the contextual, quality and quantity scores, with the selected weight values biasing the aggregated score towards the contextual score. For example, in some embodiments, the aggregate score is a weighted sum in the following format:

$$\text{Total Score} = W_C * \text{Context\_Score} + W_{QL} * \text{Quality\_Score} + W_{QN} * \text{Quantity\_Score},$$

with the context weight value ($W_C$) being larger than the quality and quantity weight values ($W_{QL}$, $W_{QN}$). After computing the aggregate score, the process 1200 determines (at 1230) whether it has computed scores for all viable template instances. If not, the process returns to 1210 to select another template instance and to repeat its operations 1215-1225 to compute the aggregate score for this template instance. When the process 1200 determines (at 1230) that it has computed scores for all viable template instances, it ends.

Figure 13:
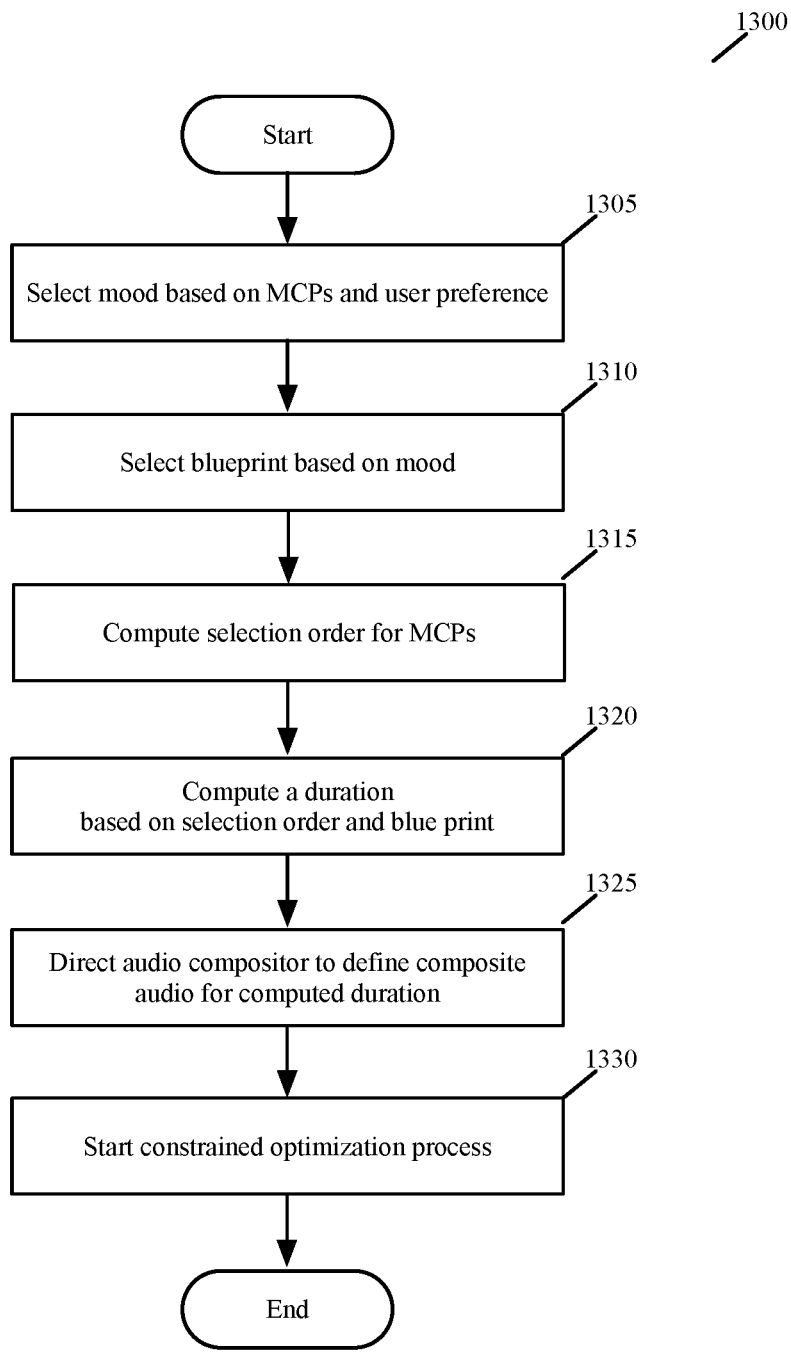
FIG. 13 illustrates a process for defining a composite presentation.

FIG. 13 illustrates a process 1300 that the media compositor 125 performs each time that it has to define a composite presentation (e.g., after a user select a template instance's summary pane and the layout generator 110 directs the media compositor 125 to generate a composite presentation definition for the template instance). As shown, the process 1300 initially selects (at 1305) the mood for the composite presentation based on the type and/or duration of media in the template instance, content analysis on this media (e.g., detection of high motion video), and/or detected user-mood preferences. This selection is automatic without receiving specific user input that specifies the mood to pick for this instance. However, in some embodiments, this automated selection is dependent by past modifications to presentation moods that the media compositor previously automatically selected for other presentations. The process accounts for these previous changes to the mood as these previous changes are informative of the type of moods that the user likes for composite presentations.

After picking the mood, the process selects (at 1310) a blueprint for the composite presentation based on the selected mood. As described above, the blueprint in some embodiments describes the desired transitions, effects, edit styles (including pace of the edits), the desired type of presentation, etc. Next, at 1315, the process defines the selection order for selecting the MCPs of the selected template instance.

Next, at 1320, the process computes a desired duration for the composite presentation based on the selection order and the blue print. The computation of the duration was described above by reference to FIG. 4. After computing (at 1320) the desired duration of the composite presentation, the process 1300 provides (at 1325) this duration to the song compositor 130 and directs this compositor to dynamically generate the definition of a song presentation that has this duration. Next, at 1330, the process 1300 starts a constrained optimization process to dynamically generate the definition of a media presentation that has the desired duration. After 1330, the process 1300 ends.

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 14:
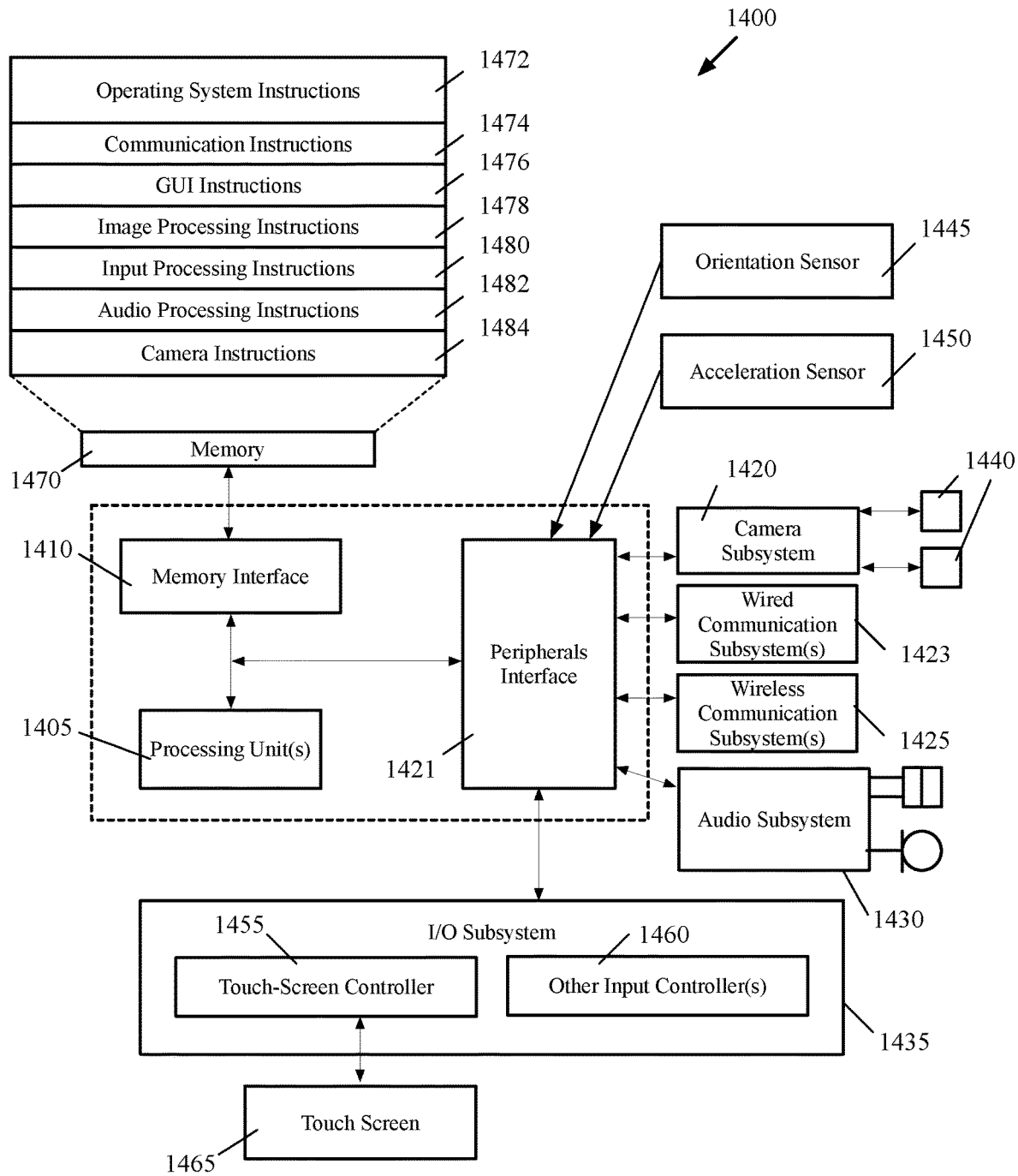
FIG. 14 is an example of an architecture of such a mobile computing device.

The applications of some embodiments operate on mobile devices, such as smart phones (e.g., iPhones®) and tablets (e.g., iPads®). FIG. 14 is an example of an architecture 1400 of such a mobile computing device. Examples of mobile computing devices include smartphones, tablets, laptops, etc. As shown, the mobile computing device 1400 includes one or more processing units 1405, a memory interface 1410 and a peripherals interface 1415.

The peripherals interface 1415 is coupled to various sensors and subsystems, including a camera subsystem 1420, a wireless communication subsystem(s) 1425, an audio subsystem 1430, an I/O subsystem 1435, etc. The peripherals interface 1415 enables communication between the processing units 1405 and various peripherals. For example, an orientation sensor 1445 (e.g., a gyroscope) and an acceleration sensor 1450 (e.g., an accelerometer) is coupled to the peripherals interface 1415 to facilitate orientation and acceleration functions.

The camera subsystem 1420 is coupled to one or more optical sensors 1440 (e.g., a charged coupled device (CCD) optical sensor, a complementary metal-oxide-semiconductor (CMOS) optical sensor, etc.). The camera subsystem 1420 coupled with the optical sensors 1440 facilitates camera functions, such as image and/or video data capturing. The wireless communication subsystem 1425 serves to facilitate communication functions. In some embodiments, the wireless communication subsystem 1425 includes radio frequency receivers and transmitters, and optical receivers and transmitters (not shown in FIG. 14). These receivers and transmitters of some embodiments are implemented to operate over one or more communication networks such as a GSM network, a Wi-Fi network, a Bluetooth network, etc. The audio subsystem 1430 is coupled to a speaker to output audio (e.g., to output voice navigation instructions). Additionally, the audio subsystem 1430 is coupled to a microphone to facilitate voice-enabled functions, such as voice recognition (e.g., for searching), digital recording, etc.

The I/O subsystem 1435 involves the transfer between input/output peripheral devices, such as a display, a touch screen, etc., and the data bus of the processing units 1405 through the peripherals interface 1415. The I/O subsystem 1435 includes a touch-screen controller 1455 and other input controllers 1460 to facilitate the transfer between input/output peripheral devices and the data bus of the processing units 1405. As shown, the touch-screen controller 1455 is coupled to a touch screen 1465. The touch-screen controller 1455 detects contact and movement on the touch screen 1465 using any of multiple touch sensitivity technologies. The other input controllers 1460 are coupled to other input/control devices, such as one or more buttons. Some embodiments include a near-touch sensitive screen and a corresponding controller that can detect near-touch interactions instead of or in addition to touch interactions. Also, the input controller of some embodiments allows input through a stylus.

The memory interface 1410 is coupled to memory 1470. In some embodiments, the memory 1470 includes volatile memory (e.g., high-speed random access memory), non-volatile memory (e.g., flash memory), a combination of volatile and non-volatile memory, and/or any other type of memory. As illustrated in FIG. 14, the memory 1470 stores an operating system (OS) 1472. The OS 1472 includes instructions for handling basic system services and for performing hardware dependent tasks.

The memory 1470 also includes communication instructions 1474 to facilitate communicating with one or more additional devices; graphical user interface instructions 1476 to facilitate graphic user interface processing; image processing instructions 1478 to facilitate image-related processing and functions; input processing instructions 1480 to facilitate input-related (e.g., touch input) processes and functions; audio processing instructions 1482 to facilitate audio-related processes and functions; and camera instructions 1484 to facilitate camera-related processes and functions. The instructions described above are merely exemplary and the memory 1470 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 14 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 14 may be split into two or more integrated circuits.

Figure 15:
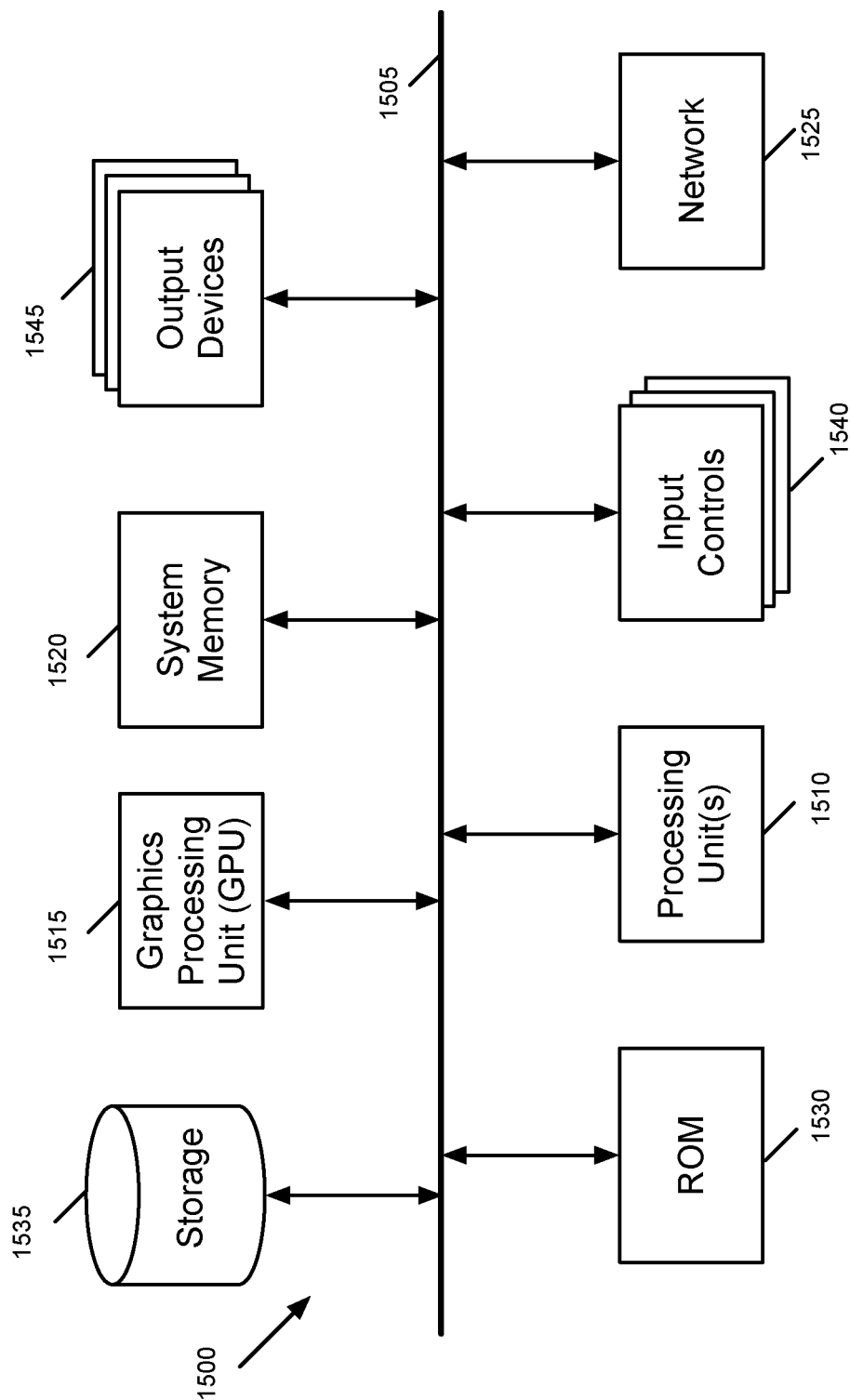
FIG. 15 conceptually illustrates another example of an electronic system with which some embodiments of the invention are implemented.

FIG. 15 conceptually illustrates another example of an electronic system 1500 with which some embodiments of the invention are implemented. The electronic system 1500 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1500 includes a bus 1505, processing unit(s) 1510, a graphics processing unit (GPU) 1515, a system memory 1520, a network 1525, a read-only memory 1530, a permanent storage device 1535, input devices 1540, and output devices 1545.

The bus 1505 collectively represents all system, peripheral, and chipset buses that communicatively connect the numerous internal devices of the electronic system 1500. For instance, the bus 1505 communicatively connects the processing unit(s) 1510 with the read-only memory 1530, the GPU 1515, the system memory 1520, and the permanent storage device 1535.

From these various memory units, the processing unit(s) 1510 retrieves instructions to execute and data to process in order to execute the processes of the invention. The processing unit(s) may be a single processor or a multi-core processor in different embodiments. Some instructions are passed to and executed by the GPU 1515. The GPU 1515 can offload various computations or complement the image processing provided by the processing unit(s) 1510.

The read-only-memory (ROM) 1530 stores static data and instructions that are needed by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the invention use a mass-storage device (such as a magnetic or optical disk and its corresponding disk drive, integrated flash memory) as the permanent storage device 1535.

Other embodiments use a removable storage device (such as a floppy disk, flash memory device, etc., and its corresponding drive) as the permanent storage device. Like the permanent storage device 1535, the system memory 1520 is a read-and-write memory device. However, unlike storage device 1535, the system memory 1520 is a volatile read-and-write memory, such a random access memory. The system memory 1520 stores some of the instructions and data that the processor needs at runtime. In some embodiments, the invention's processes are stored in the system memory 1520, the permanent storage device 1535, and/or the read-only memory 1530. For example, the various memory units include instructions for processing multimedia clips in accordance with some embodiments. From these various memory units, the processing unit(s) 1510 retrieves instructions to execute and data to process in order to execute the processes of some embodiments.

The bus 1505 also connects to the input and output devices 1540 and 1545. The input devices 1540 enable the user to communicate information and select commands to the electronic system. The input devices 1540 include alphanumeric keyboards and pointing devices (also called cursor control devices (e.g., mice)), cameras (e.g., webcams), microphones or similar devices for receiving voice commands, etc. The output devices 1545 display images generated by the electronic system or otherwise output data. The output devices 1545 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 15, bus 1505 also couples electronic system 1500 to a network 1525 through a network adapter (not shown). In this manner, the computer can be a part of a network of computers (such as a local area network ("LAN"), a wide area network ("WAN"), or an Intranet), or a network of networks, such as the Internet. Any or all components of electronic system 1500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

The invention claimed is:

1. A mobile device comprising:
   one or more processors; and
   a non-transitory machine readable medium storing a program for creating a composite presentation, the program comprising sets of instructions that, when executed by the one or more processors, cause:
      identifying different groups of media content pieces (MCPs) stored on the mobile device;
      calculating a score for each MCP included in the different groups of MCPs, wherein MCPs that only comprise still-frame photographs are assigned a lower score relative to other MCPs, and wherein MCPs captured at locations other than either of a home location and a work location determined for the mobile device are assigned a higher score relative to MCPs captured at either of the home location and the work location for the mobile device;
      based on a set of contextual attributes and the scores, identifying, at a present time, a set of MCP groups that are more relevant at the present time than other MCP groups stored on the mobile device;
      defining a plurality of different composite presentations, one different composite presentation for each MCP group in the identified set of MCP groups; and
      generating a layout that displays the plurality of defined composite presentations as selectable presentations for display.

2. The mobile device of claim 1, wherein the program further comprises sets of instructions for:
   determining, from a current location of the mobile device, that the mobile device has left a first location that is not a common prior location of the mobile device; and
   identifying the first location as a contextual attribute, and wherein identifying the set of MCP groups further comprises identifying a group of MCPs that were captured by the mobile device within a region near to the first location.

3. The mobile device of claim 2, wherein a second location is identified as a home location of the mobile device, and wherein the program further comprises a set of instructions for determining that the first location is a vacation location due to a distance between the first location and the second location.

4. The mobile device of claim 1, wherein the program further comprises sets of instructions for:
   determining that the mobile device has left a first location that is not designated as a home location or a work location of the mobile device; and
   identifying the first location as a contextual attribute, and wherein identifying the set of MCP groups further comprises identifying a group of MCPs that were captured by the mobile device within a region near to the first location.

5. The mobile device of claim 4, wherein the first location is a public recreational area including one of a beach, a lake, a park, and a stadium.

6. The mobile device of claim 4, further comprising a camera for capturing MCPs, wherein the program further comprises a set of instructions for deriving the home location and the work location based on metadata associated with MCPs captured by the mobile device within the region near to the first location.

7. The mobile device of claim 4, wherein the program further comprises sets of instructions for:
   performing a location-identifying service that identifies two common prior locations of the mobile device as the home location and the work location; and
   obtaining the home location and the work location from the location-identifying service.

8. The mobile device of claim 1, wherein the set of instructions for identifying the different MCP groups, identifying the set of MCP groups, defining the plurality of different composite presentations, and generating the layout are performed in an automated manner by the mobile device without user input, and wherein each of the plurality of different composite presentations comprise audio.

9. The mobile device of claim 1, wherein the set of instructions for identifying the different MCP groups comprises sets of instructions for:
   identifying groups of time-bounded and location-bounded MCPs, each time-bounded and location-bounded MCP group comprising MCPs captured within a first contiguous period of time at a first location; and
   identifying groups of time-unbounded and location-bounded MCPs, each time-unbounded and location-bounded MCP group comprising MCPs captured in different contiguous periods of time at the first location, and
   wherein any contiguous period of time does not exceed a threshold time period.

10. The mobile device of claim 9,
    wherein at least one time-unbounded and location-bounded MCP group comprises MCPs that comprise a particular content, and
    wherein a particular time-bounded and location-bounded MCP group comprises MCPs that comprise the particular content.

11. The mobile device of claim 10, wherein the particular time-bounded and location-bounded MCP group is selected from a group that comprises:

a set of MCPs that are captured in a trip to the first location on a particular day; and a set of MCPs that are captured in a vacation to the first location that lasts several days.

12. The mobile device of claim 1, wherein the MCPs stored on the mobile device have associated metadata, wherein the different groups of MCPs are identified based on different sets of MCP metadata, and wherein the set of instructions for identifying different groups of MCPs comprises a set of instructions for:

discarding any MCPs that do not meet a threshold score; and discarding any MCP groups that do not have a threshold number of MCPs that satisfy a quality metric, wherein specialty MCPs are assigned higher scores relative to an MCP that only comprises a still-frame photograph.

13. The mobile device of claim 12, wherein the associated metadata of the MCPs includes a time when an associated MCP was captured, location when the associated MCP was captured, and whether the associated MCP includes a face.

14. The mobile device of claim 12, wherein the program further comprises a set of instructions for:

after the discarding, sorting remaining MCP groups in an order based on relevance of MCP metadata, assigned score, and derived contextual attributes of the remaining MCP groups, wherein the set of MCP groups is further selected based on the sorted order of the remaining MCP groups.

15. The mobile device of claim 1, wherein the program further comprises a set of instructions for:

generating a profile that identifies locations to which the mobile device has traveled, wherein the different groups of MCPs are further identified based on the generated profile.

16. The mobile device of claim 15, wherein each composite presentation is associated with at least one presentation type, and wherein the profile is further generated based on types of composite presentations previously selected for display on the mobile device.

17. A non-transitory machine readable medium storing a program for creating a composite presentation, the program comprising sets of instructions that, when executed by one or more processors, cause:

identifying different groups of media content pieces (MCPs);

calculating a score for each MCP included in the different groups of MCPs, wherein MCPs that only comprise still-frame photographs are assigned a lower score relative to other MCPs, and wherein MCPs captured at locations other than either of a home location and a work location determined for the mobile device are assigned a higher score relative to MCPs captured at either of the home location and the work location for the mobile device;

defining different composite presentations for the different MCP groups;

based on a derived set of contextual attributes and the scores, identifying, at a present time, a subset of the different composite presentations that are more relevant at the present time than other different composite presentations for display; and generating a layout that displays the subset of composite presentations as presentations that are selectable for display.

18. The non-transitory machine readable medium of claim 17, wherein the program further comprises a set of instructions for deriving the set of contextual attributes, the set of contextual attributes including at least two attributes selected from a group consisting of: a time, a past location of a mobile device, a current location of the mobile device, and a current direction of travel of the mobile device.

19. The non-transitory machine readable medium of claim 17, wherein one contextual attribute of the set of contextual attributes is derived from a current date, and wherein the set of instructions for identifying the subset of the different composite presentations comprises a set of instructions for identifying a composite presentation that is defined for a group of MCPs that were captured at a previous event that has an upcoming anniversary.

20. The non-transitory machine readable medium of claim 17, wherein one contextual attribute of the set of contextual attributes is derived from an event stored by a calendar application or an electronic ticket application, and wherein each of the subset of composite presentations comprise audio.

* * * * *